(12) United States Patent
Jackson

(10) Patent No.: US 10,639,691 B1
(45) Date of Patent: May 5, 2020

(54) METHOD FOR FORMING AND APPLYING AN OXYGENATED MACHINING FLUID

(71) Applicant: David P. Jackson, Saugus, CA (US)

(72) Inventor: David P. Jackson, Saugus, CA (US)

( * ) Notice: Subject to any disclaimer, the term of this patent is extended or adjusted under 35 U.S.C. 154(b) by 481 days.

(21) Appl. No.: 13/733,880

(22) Filed: Jan. 3, 2013

Related U.S. Application Data

(60) Provisional application No. 61/583,186, filed on Jan. 5, 2012.

(51) Int. Cl.
*B21C 99/00* (2009.01)

(52) U.S. Cl.
CPC .................................. *B21C 99/00* (2013.01)

(58) Field of Classification Search
CPC ........ B21C 99/00; B21D 37/18; B21D 22/201
USPC ......... 72/41–44; 427/427.4–427.7; 184/6.14, 184/6.21, 6.26
See application file for complete search history.

(56) References Cited

U.S. PATENT DOCUMENTS

| | | | |
|---|---|---|---|
| 2,302,289 A | 11/1942 | Bramston-Cook | |
| 2,894,691 A | 7/1959 | Sedlacsik | |
| 3,648,401 A | 3/1972 | Stains | |
| 3,670,606 A | 6/1972 | Blomgren | |
| 3,734,412 A | 5/1973 | Haas | |
| 3,747,284 A | 7/1973 | Lyzeko | |
| 3,862,391 A | 1/1975 | Blomgren | |
| 3,917,114 A | 11/1975 | Grosse | |
| 4,073,966 A | 2/1978 | Scholes | |
| 4,341,347 A | 7/1982 | DeVittorio | |
| 4,749,125 A | 6/1988 | Escallon | |
| 4,776,515 A | 10/1988 | Michalchik | |
| 4,829,859 A | 5/1989 | Yankoff | |
| 4,846,986 A * | 7/1989 | Trivett | .......................... 508/283 |
| 5,002,156 A | 3/1991 | Gaunt | |
| 5,039,404 A * | 8/1991 | Norcross | ...................... 210/151 |
| 5,056,720 A | 10/1991 | Crum | |

(Continued)

FOREIGN PATENT DOCUMENTS

| | | | |
|---|---|---|---|
| CN | 101811269 A | * | 8/2010 |
| DE | 19903243 | | 8/2000 |
| WO | WO01/74538 | | 10/2001 |

OTHER PUBLICATIONS

Thermally Stable Lubricants from Vegetable Oils, R. Vicray, Michigan State University, Department of Chemical Engineering and Material Science.*

(Continued)

*Primary Examiner* — Teresa M Ekiert
(74) *Attorney, Agent, or Firm* — Law Office of David Hong

(57) ABSTRACT

The present invention describes a chemically-assisted machining process that converts conventional lubricant chemistries to produce reactive oxygenated species that accelerate the formation of friction-reducing boundary layer lubrication during cutting operations—termed "Ozonolytic Machining". The new type of cooling-lubricant chemistry is based on chemical reactions between unsaturated bio-based oils and alcohols, and other types of machining lubricants, containing carbon-carbon double or triple bonds, with ozone gas to form variously reacted or polymerized ozonides—termed "super-oxygenated fluids, oils or alcohols, aldehydes or ketones," "sulfurized ozonides" and "super-oxygenated gels."

17 Claims, 19 Drawing Sheets

(56) References Cited

U.S. PATENT DOCUMENTS

Figure 1:
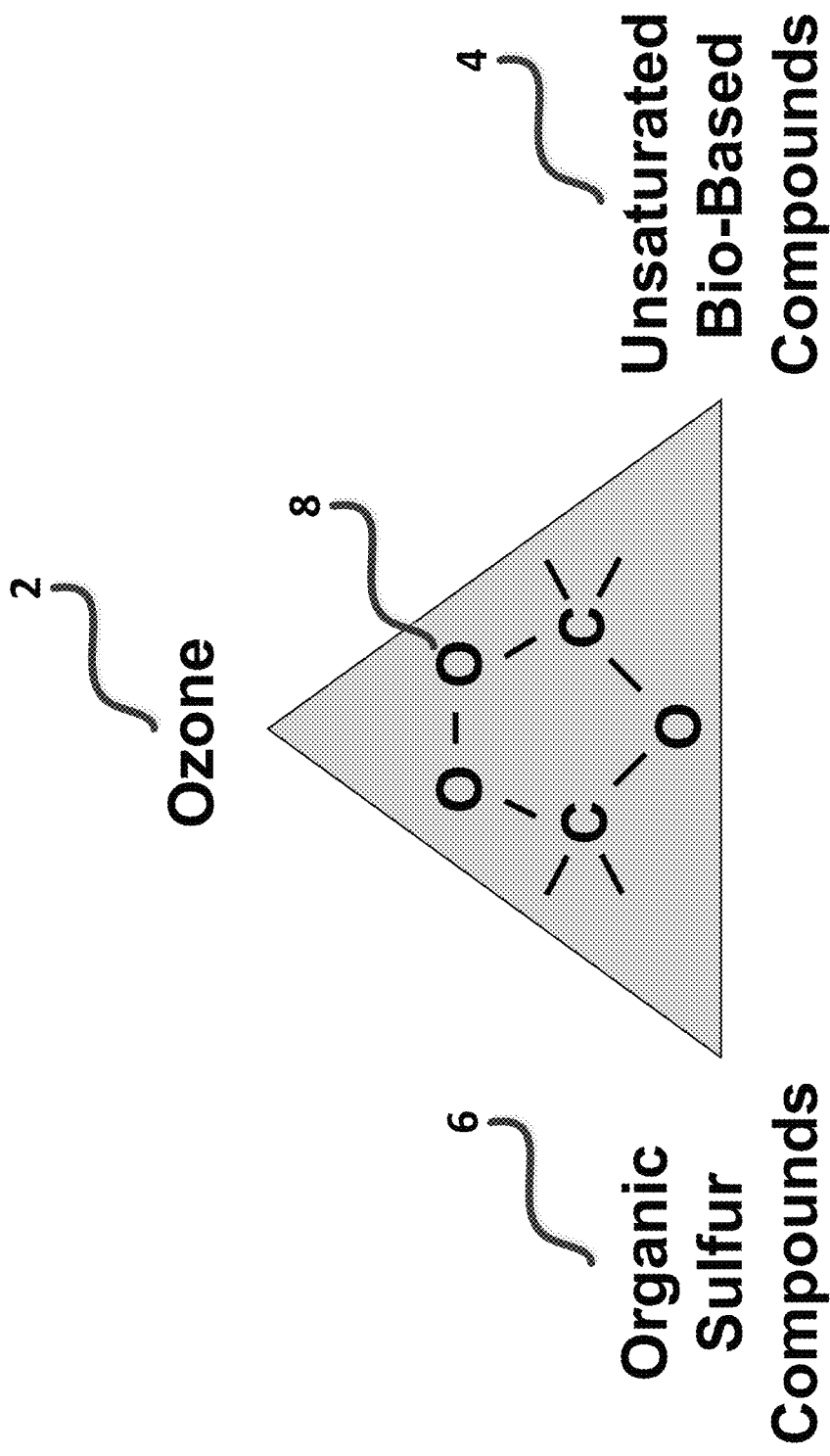

| | | | |
|---|---|---|---|
| 5,124,132 | A | 6/1992 | Francis |
| 5,312,598 | A | 5/1994 | Kersey |
| 5,333,640 | A | 8/1994 | Swift |
| 5,402,940 | A | 4/1995 | Haller |
| 5,409,418 | A | 4/1995 | Krone-Schmidt |
| 5,444,634 | A | 8/1995 | Goldman |
| 5,509,335 | A | 4/1996 | Emerson |
| 5,591,412 | A | 1/1997 | Jones |
| 5,592,863 | A | 1/1997 | Jaskowiak |
| 5,725,154 | A | 3/1998 | Jackson |
| 5,901,623 | A | 5/1999 | Hong |
| 6,105,886 | A | 8/2000 | Hollstein |
| 6,206,764 | B1 | 3/2001 | Hsu |
| 6,564,682 | B1 | 5/2003 | Zurecki |
| 6,656,017 | B2 | 12/2003 | Jackson |
| 6,802,961 | B2 | 10/2004 | Jackson |
| 6,979,362 | B2 | 12/2005 | Jackson |
| 7,134,946 | B1 | 11/2006 | Jackson |
| 7,198,043 | B1 | 4/2007 | Zhang |
| 7,219,677 | B1 | 5/2007 | Jackson |
| 7,225,819 | B2 | 6/2007 | Jackson |
| 7,293,570 | B2 | 11/2007 | Jackson |
| 7,389,941 | B2 | 6/2008 | Jackson |
| 7,451,941 | B2 | 11/2008 | Jackson |
| 7,601,112 | B2 | 10/2009 | Jackson |
| 7,901,540 | B2 | 3/2011 | Jackson |
| 8,021,489 | B2 | 9/2011 | Jackson |
| 8,048,830 | B1 | 11/2011 | Jackson |
| 8,197,603 | B2 | 6/2012 | Jackson |
| 8,901,324 | B2 | 12/2014 | Johnson |
| 2002/0020691 | A1 | 2/2002 | Jewett |
| 2004/0003828 | A1 | 1/2004 | Jackson |
| 2005/0010069 | A1* | 1/2005 | Fitchett et al. ............... 568/959 |
| 2006/0207934 | A1* | 9/2006 | Vernik et al. ................. 210/634 |
| 2006/0278254 | A1 | 12/2006 | Jackson |
| 2007/0246064 | A1 | 10/2007 | Jackson |
| 2008/0026967 | A1* | 1/2008 | Suda et al. ..................... 508/459 |
| 2008/0127718 | A1* | 6/2008 | Lesieur ......................... 73/54.09 |
| 2008/0227993 | A1* | 9/2008 | Zuckerman ................... 554/149 |

OTHER PUBLICATIONS

Thermally Stable Vegetable Oil Based Lubricants via Reductive Ozonolysis, Ryan D. Vicray, Michigan State University Department of Chemical Engineering and Materail Science, 2004.*

Vicray, R., et. al.; "Thermally Stable Lubricants from Vegetable Oils." Global Plastics Environmental Conference 2004:151-155; see website: http://sperecycling.org/sites/sperecycling.org/files/gpec/GPEC2004/papers/020.pdf.

U.S. Appl. No. 11/766,762, filed Jun. 21, 2007 for Method of Treatment a Substrate; first inventor: Jackson.

U.S. Appl. No. 11/425,087, filed Jun. 19, 2006 for Method for Selectively Treating a Substrate Surface; first inventor: Jackson.

U.S. Appl. No. 10/362,598, filed Jun. 13, 2003 for Surface Cleaning and Modification Processes, Methods and Apparatus Using Physicochemically; first inventor: Jackson.

U.S. Appl. No. 10/393,872, filed Mar. 21, 2003 for Precision Surface Treatment Using Dense Fluids and a Plasma; first inventor: Jackson.

U.S. Appl. No. 13/733,880, filed Jan. 3, 2013; U.S. Appl. No. 61/583,186, filed Jan. 5, 2012 for Method for forming and applying an oxgenated machining fluid; first inventor: Jackson.

U.S. Appl. No. 61/843,730, filed Jul. 8, 2013 for Method for Treating a Substrate Surface using Ozonated Solvent and Ultraviolet Light; first inventor: Jackson.

U.S. Appl. No. 61/843,751, filed Jul. 8, 2013 for Method and Apparatus for Cutting and Cleaning a Superhard Substrate; first inventor: Jackson.

U.S. Appl. No. 61/583,186, filed Jan. 5, 2012 for Method for Forming and Applying an Oxygenated Machining Fluid; first inventor: Jackson.

U.S. Appl. No. 61/583,190, filed Jan. 5, 2012 for Method and Apparatus for Cutting and Cleaning a Superhard Substrate; first inventor: Jackson.

U.S. Appl. No. 10/362,598, filed Jun. 13, 2003 for Surface Cleaning and Modification Processes . . . ; first inventor: Jackson.

U.S. Appl. No. 11/465,762, filed Aug. 18, 2006 for Dense Fluid Delivery Apparatus; first inventor: Jackson.

U.S. Appl. No. 11/271,725, filed Nov. 9, 2005 for Dense Fluid Cleaning . . . ; first inventor: Jackson.

U.S. Appl. No. 13/423,603, filed Mar. 19, 2012; U.S. Appl. No. 61/454,026, filed Mar. 18, 2011 for Method and Apparatus for Thermal Control within a Machining Process; first inventor: Jackson.

U.S. Appl. No. 11/465,775, filed Aug. 18, 2006 for Method and apparatus for treating a substrate with Dense Fluid and Plasma; first inventor: Jackson.

U.S. Appl. No. 10/433,833, filed Jun. 9, 2003 for Apparatus, Process and Method for Mounting and Treating a Substrate; first inventor: Jackson.

U.S. Appl. No. 10/343,734, filed Jan. 1, 2003 for Method and Apparatus for Supercritical Ozone treatment of a substrate; first inventor: Jackson.

U.S. Appl. No. 60/635,399, filed Dec. 13, 2004 for Method, process, chemistry and apparatus for selective thermal control, lubrication and post-cleaning a substrate; first inventor: Jackson.

U.S. Appl. No. 60/635,230, filed Dec. 13, 2004 for Method and app. for selectively treating a substrate using cryogenic sprays; first inventor: Jackson.

U.S. Appl. No. 10/221,593, filed Sep. 12, 2002 for dense fluid spray cleaning process and apparatus; first inventor: Jackson.

U.S. Appl. No. 08/516,530, filed Aug. 18, 1995 for dense fluid spray cleaning process and apparatus; first inventor: Jackson.

U.S. Appl. No. 10/221,767, filed Mar. 13, 2001 for dense fluid cleaning centrifugal phase shirting separation process and apparatus; first inventor: Jackson.

U.S. Appl. No. 10/476,108, filed Oct. 24, 2003 for apparatus and process for the treatment, delivery and recycle of process fluids . . . ; first inventor: Jackson.

U.S. Appl. No. 13/016,836, filed Jan. 28, 2011 for substrate treatment process; first inventor: Jackson.

U.S. Appl. No. 10/428,793, filed May 2, 2003 for Method and Apparatus for Selective Treatment of a Precision Substrate Surface; first inventor: Jackson.

U.S. Appl. No. 10/393,872, filed Mar. 21, 2003 for Precision Surface Treats Using Dense Fluids and a Plasma; first inventor: Jackson.

U.S. Appl. No. 13/863,318, for Particle-Plasma Ablation Process; first inventor: Jackson.

U.S. Appl. No. 61/820,524, filed May 7, 2013 for Photomechanical Machining Method for a Dielectric Cutting System; first inventor: Jackson.

U.S. Appl. No. 61/836,636 for Det. of Composition and Structure of a CO2 Composite Spray; first inventor: Jackson.

U.S. Appl. No. 61/836,635for CO2 Composite Spray Method and Apparatus; first inventor: Jackson.

U.S. Appl. No. 61/624,322, filed Apr. 15, 2012; U.S. Appl. No. 13/863,311, filed Apr. 15, 2013 for Particle-Plasma Abelation Process; Inventors: Jackson and Endres.

U.S. Appl. No. 13/863,318, filed Apr. 15, 2013 for Particle-Plasma Abelation Process; Inventors: Jackson and Endres.

U.S. Appl. No. 14/307,488, filed Jun. 17, 2014; U.S. Appl. No. 61/836,635, filed Jun. 18, 2013; U.S. Appl. No. 61/836,636, filed Jun. 18, 2013 for CO2 Composite Spray Method and Apparatus; Inventors: Jackson, et. al.

U.S. Appl. No. 14/308,697, filed Jun. 18, 2014; U.S. Appl. No. 61/836,635, filed Jun. 18, 2013; U.S. Appl. No. 61/836,636, filed Jun. 18, 2013 for Det. of Composition and Structure of CO2 Composite Spray; Inventors: Jackson, et. al.

PCT/US2014/043046, filed on Jun. 18, 2014 for Method and Apparatus for Forming and Regulating a CO2 Composite Spray; Inventor: Jackson, et. al.

(56) References Cited

OTHER PUBLICATIONS

U.S. Appl. No. 14/325,278, filed Jul. 7, 2014 for Method for Treating a Substrate Surface Using Ozonated Solvent and Ultraviolet Light; Inventor: Jackson; U.S. Appl. No. 61/843,730, filed Jul. 8, 2013.
U.S. Appl. No. 14/335,875, filed Jul. 18, 2014 for Method and Appraatus for Cutting and Cleaning a Superhard Substrate; Inventor: Jackson.

* cited by examiner

Type I
Oxygenated
Bio-Based

190

Ozonolysis of one or more bio-based compounds (i.e., Algae/Seed/Plant Oils, Alcohols, Esters) and/or other bio-based organic compounds containing one or more carbon-carbon double for triple bonds, and (optionally) containing one or a combination of the following:

- EP Agents (i.e., Sulfurized compounds, PFPE)
- Corrosion Prevention Agents (i.e., Zinc Dithiophosphate)
- Viscosity Agents (i.e., other lighter/heavier organic solutes)
- Cooling Agents (i.e., dissolved gases (CO2, N2, Air))

Type II
Oxygenated
Synthetic

192

Ozonolysis of one or more synthetic or semi-synthetic compounds (i.e., PAO/Esters) and/or other synthetic organic compounds containing one or more carbon-carbon double for triple bonds, and (optionally) containing one or a combination of the following:

- EP Agents (i.e., Sulfurized compounds, PFPE)
- Corrosion Prevention Agents (i.e., Zinc Dithiophosphate)
- Viscosity Agents (i.e., other lighter/heavier organic solutes)
- Cooling Agents (i.e., dissolved gases (CO2, N2, Air))

Type III
Oxygenated
Microemulsion

194

Ozonolysis of deionized water containing one or more bio-based, synthetic or semi-synthetic compounds and/or other bio-organic or synthetic compounds containing one or more carbon-carbon double for triple bonds, and (optionally) containing one or a combination of the following:

- EP Agents (i.e., DMSO)
- Corrosion Prevention Agents (i.e., Zinc Dithiophosphate)
- Electrical Conductivity Agents (i.e., KCl)
- Surface Tension/Emulsifying Agents (i.e., surfactants)
- Cooling Agents (i.e., dissolved gases (CO2, N2, Air))

FIG. 17

METHOD FOR FORMING AND APPLYING AN OXYGENATED MACHINING FLUID

This application claims the benefit of U.S. Provisional Patent Application No. 61/583,186, filed on Jan. 5, 2012, which is incorporated by reference in entirety.

FIELD OF INVENTION

The present invention relates generally to machining coolants and lubricants, and more particularly to bio-based and super-oxygenated flood and minimum quantity cooling lubrication sprays. Still more particularly the present invention relates to chemically-assisted machining of challenging materials such as superhard materials, thermally non-conductive materials and abrasive or reactive materials using coated and uncoated high speed steel (HSS), tungsten, ceramic and diamond tools.

BACKGROUND

Oxygen is essential for innumerable natural and industrial processes. For many physical processes, the addition of excess oxygen, in place of air, typically enhances the kinetics—reaction rates and efficiencies—of these oxygen-dependent processes (Hendershot). In machining processes, in particular heavily loaded tribosystems (HLTS) such cutting and stamping processes, it is well established that oxygen; present in the atmosphere, dissolved in cutting/stamping fluid, and/or present as functional groups), is critical to the productivity or even efficacy of many cutting and stamping operations. In the absence of surface oxides, adhesion and complete welding of solid surfaces (tool-chip, tool-substrate) can occur (Buckley). This will negatively impact tool life, surface finish and machinability.

Conventional methods used to improve oxygenation in machining fluids include adding compounds containing oxygen functional groups including esters, alcohols, and aldehydes. For example, in U.S. Pat. No. 6,206,764, long chain alcohols, preferably derived from bio-based oils, are used to provide more effective lubrication and cooling action during the dicing or cutting of super hard ceramics. The enhancement over prior art is presumably (according to the present inventor) due to the presence of oxygenated (more specifically hydroxyl) species present in the oleic backbone, and demonstrates the importance of oxygen in dicing or grinding processes employing diamond blades.

Oxygenated compounds such as inorganic peroxides and ozone have been examined as lubricants in machining applications. Experiments with both hydrogen peroxide ($H_2O_2$) and sodium permanganate ($NaMnO_4$) have demonstrated the benefits of oxygenating the cutting zone (Schey, Page 625). U.S. Pat. No. 3,670,606 (Blomgren) taught projecting an electrostatic discharge needle into a cutting zone, which produces ionic wind, radicals and ozone, which was found to eliminate machining heat very effectively. Although Blomgren attributed the heat reduction observations mainly to the presence of the electrostatic field (silent discharge, without arcing), the electric wind carrying ionized species and in particular oxygen and ozone have since been demonstrated to play a very important role in friction reduction, hence lowering cutting heat as observed by Blomgren. For example, ozonated air has been demonstrated as a viable dry lubricant means for cutting ferrous steels (Han). Iron oxides provide excellent boundary layer lubrication (Schey Page 41), so it would be expected that ozonated air would produce ample iron oxide lubrication. However, metal oxides derived from nickel, aluminum, titanium, lead and zinc do not work well as boundary layer lubricants due to their extreme hardness, much higher than the nascent metal from which they have been formed. In these applications, special cutting tools and coatings and/or lubricants must be employed.

The present inventor has developed machining fluid inventions utilizing carbon dioxide, a mole of which contains two moles of oxygen. One exemplary invention that embodies the relevant prior art in this regard is U.S. Pat. No. 7,389,941. The '941 patent includes a nozzle device and method for forming a composite fluid. The nozzle device generally comprises a nozzle portion connected to a main body. The main body includes an inner axial bore extending there through. The apparatus contains a tube for transporting carbon dioxide particles within the axial bore of the main body and nose section, terminating at an exit port of the nozzle section. A second tube for transporting lubricants and additives disposes within the axial bore of the main body, terminating proximate the portal. A propellant fluid (typically compressed air) introduced under pressure into the bore of the main body directs both the carbon dioxide particles and lubricants toward the cutting zone. An electrostatic charging device is taught for enhancing the vortical mixing and coalescence the carbon dioxide particles and lubricant additives in transit and into the cutting zone. A drawback of this invention is that both carbon dioxide coolant and oxygenating fluid (compressed air) consumption can be very high (and subsequently very expensive); thus applications using the '941 invention are fairly restricted to relatively low volume and extremely hard to machine applications that can demonstrate a significant return-on-investment due to improvement in machining productivity. The present inventor believes that a lack of performance by $CO_2$ based fluids for this particular application is due to one or a combination of the following factors–1) the energy needed to break the carbon-oxygen bond in $CO_2$ is very high (783 kJ/mole) compared to oxygen (498 kJ/mole); 2) $CO_2$ shields much of the oxygen gas needed for proper surface lubrication from the cut zone, 3) slower oxidation rate of nascent stainless steel (and other high Ni or Cr alloy) surfaces, and 4) cooler operating temperatures afforded by $CO_2$ sublimable coolant particles. A lack of oxygen and too low of cutting temperature in the cutting zone is known to negatively affect steel machining performance. Conventional machining fluid processes using air-oil and flooded air-oil-water coolant and operating at much higher cutting zone temperatures have demonstrated as good as or better performance (i.e., tool life) than carbon dioxide fluids of '941 in these particular machining applications. For example, experiments performed using $CO_2$ particles and oil (Nguyen) demonstrated low performance in hard grinding processes due to high cost of $CO_2$ and "oxygen starvation" in the working environment. Nguyen determined that cold air and oil provided lower grinding forces, presumably due to enhanced oxygenation of the grinding/cutting zone. The present inventor has experienced the same negative result in hard grinding applications utilizing the '941 invention.

Another more conventional method of oxygenating a machining fluid is to mix small quantities of lubricant with air, called minimum quantity lubrication (MQL). The conventional method of MQL, for example the application of a spray emulsion of water-oil, involves conveying the fluid to the tip of a suitable nozzle which is subsequently atomized to form an aerosol comprising gas-liquid particles. The resulting MQL aerosol spray is directed upon the surfaces being machined. Upon contact, the result is the evaporation or expansion of the more volatile phase (water-gas), providing cooling to the cutting edge and machining tool and the deposition of the less volatile phase (oil and additives) as a film which provides the lubricity necessary for efficient cutting and longevity of the cutting tool. However, a drawback of this approach is that the air is only 20% oxygen and 80% other gases that do not contribute oxides. Another drawback is the low solubility of oxygen in lubricating fluids such as oils, thereby not readily dissolving in solution.

In studies comparing flood and MQL machining, it has been found that the oxygen content is critical to the performance of the lubricant (Weinert, Inasaki). It was determined one study that an increase in oxygen content in the vicinity of the vegetable oil ester increased lubricant adsorption on the polar metal surfaces, which lowered the friction coefficient. Thus oxygen content in oil, whether delivered as a flood or MQL, is a key process variable. Moreover, similar to oxygen functionalization, organic sulfur groups present on the oil molecule itself have been proven to lower friction (hence heat) in metal cutting operations (Sharma).

Still moreover, the efficient and effective application of conventional MQL sprays to machined articles by mechanical atomization presents several challenges. When sufficiently high spray velocities are employed to provide enough energy to reach cutting zone surfaces, the majority of the spray tends to deflect from or stream around surfaces rather than impinge upon them. When low velocity atomization is employed, critical surfaces with recesses or complex surfaces cannot be penetrated effectively. Also, it is known that oil droplets, evenly finely atomized, tend to agglomerate into larger droplets during transition from spray nozzles to surfaces. This phenomenon interferes with the even distribution of coolants and lubricants on machined surfaces and causes a large portion of the atomized spray to missed the substrate entirely if positioned at location far away from the substrate being machined, wasting a portion of the applied spray. Still moreover, conventional atomized MQL sprays can create a fog or fine mist, which has been determined to be hazardous to workers and is considered an in-door air pollutant.

Methods to improve atomization and minimizing "fog" creation have been developed. For example, Trico Manufacturing Company, Pewaukee, Wis. has developed a micro-dispensing system. In this system, lubricating oil is introduced into the interior region of flow nozzle using a separate delivery tube and air which flows along the outside of the nozzle gently break-ups the oil droplets and incorporate them into the airstream. This type of system is described fully in an article entitled "Micro-Improvement: Advanced Lubricants and Nozzles Improve Fluid-Mist Systems", by B. Rake, Cutting Tool Engineering Magazine, April 2002, Volume 54, Number 4.

Other conventional MQL delivery methods and apparatuses are described in U.S. Pat. Nos. 5,002,156, 5,333,640 and 5,444,634, and also as available as the AccuLube (Trademark of ITW) Precision Lubricant Applicator system available commercially from Illinois Tool Works, Rocol Division, Glenview, Ill.

In an article entitled "Dry Goods: Factors to Consider when Dry or Near-dry Machining", Greg Landgraf, Cutting Tool Engineering, January 2004, Volume 56, No. 1, several major MQL challenges are cited by experts in the field which have heretofore not been adequately addressed. Cited challenges include 1) lubricating the exact cutting edge, 2) inability of mist to make it around sharp edges, 3) preventing coolant-lubricant from collecting in the delivery lines and spray nozzles, 4) fine sprays do not work well with fast moving tools or substrates and 5) inability to evenly coat the cutting edge or workpiece, among several other related challenges. Moreover in an article entitled "In the prior art, dielectric gases and particles have been charged principally by two methods; 1.) Charging using a corona discharge and 2.) Charging by contacting them with one another or surfaces having different dielectric properties, a phenomenon called passive charge transfer or tribocharging. Electrical-energy induced electrostatic processes (corona charging processes) have been employed in a variety of commercial spray applications to beneficially improve transfer efficiency. These are described in detail in U.S. Pat. Nos. 2,302,289, 2,894,691, 5,056,720, 5,312,598, 5,591,412, and 6,105,886. Moreover tribocharging processes are described in U.S. Pat. No. 5,402,940, as well as combinational corona and tribocharging system as described in U.S. Patent Application Publication US 2004/0251327 A1. These systems have been used for example to coat metals with polymeric paint particles, a process called powder coating, wherein the electrostatically charged particles are entrained and delivered to a surface in a secondary fluid such as compressed air.

Electrostatic fields have also been used to charge a lubricating oil to coat metal surfaces. In U.S. Pat. No. 4,073,966 Scholes et al teach corona charging a lubricating oil and delivering this charged lubricant into a machine as a means for improved surface coating for general machine lubrication applications. However this method does not teach using a phase change agent to accomplish the inductive charging or directing the electric field generated by same into a workpiece surface being cut by a machining tool. Moreover, the charged oils in '966 are delivered as charged liquids entrained in a propellant gas, and not means for increasing particle density due to phase change of the charged oil droplet is taught such as in the present invention. Another significant limitation of this approach for metalworking applications is the poor heat capacity of the oil or propellant gas for most material cutting applications discussed herein.

Other electrostatic spraying methods have been developed, called "electrohydrodynamic spraying". Electrohydrodynamic spraying conveys and coats surfaces with small quantities of dielectric fluids such as oils without the need for a secondary fluid conveyance stream. These are described fully in U.S. Pat. Nos. 3,648,401, 4,341,347, 4,749,125 and 4,776,515. A commercial electrohydrodynamic spraying system described in U.S. Pat. No. 4,749,125 is available from Terronics Development Corporation, Elwood, Ind.

The application of electrostatic fields to cool cutting operations as previously taught by Blomgren are part of a larger discipline called Electrohydrodynamics (EHD), also known as electro-fluid-dynamics (EFD) or electrokinetics. EHD is the study of the dynamics of electrically conducting fluids. It is the study of the motions of ionized particles or molecules and their interactions with electric fields and the surrounding fluid. In general, this phenomenon relates to the direct conversion of electrical energy into kinetic energy, and vice versa. In the first instance, shaped electrostatic fields create hydrostatic pressure (or motion) in dielectric media, such as air. When such media are in a gas or liquid state, such as when a solid carbon dioxide particle changes into a liquid upon impact within a cut zone, electro-capillary flow is produced which enhances penetration, wetting and lubrication, and heat extraction. Moreover, charged aerosols directed against an interface (i.e., conductive workpiece and dielectric coated cutting tool (i.e., diamond), representing electrode pairs in effect, generates current flow such as in an electric motor. Such electrical flows produce energy flow (heat, electrons) at the interface to reduce tool wear.

EHD cooling aspects have been studied elsewhere. For example, in an article entitled "The effect of an electric field on boiling heat transfer of refrigerant-11-boiling on a single tube", Kawahira, H.; Kubo, Y.; Yokoyama, T.; Ogata, J. Industry Applications, IEEE Transactions, Volume 26, Issue 2, March/April 1990 Page(s):359-365, The effect of an electric field on boiling refrigerant R-11 was investigated experimentally. The test section consisted of a flat plate and a single tube with several rows of electrode wire. In the tests performed, it was found that as the applied voltage increased, the number of boiling bubbles decreased but the heat transfer coefficient increased, and the polarity of the applied voltage affected the boiling heat transfer.

In an article entitled: "Motivation and results of a long-term research on pool boiling heat transfer in low gravity", P. Di Marco and W. Grassi, LOTHAR (LOw gravity and THermal Advanced Research Laboratory), Dipartimento di Energetica "L. Poggi", Università di Pisa, Italy, 20 May 2002, It was experimentally shown that the application of an external electric field generally enhanced the heat exchange between a heated wire and a liquid pool. The single-phase heat transfer coefficient was improved, the nucleate boiling region was extended to higher heat fluxes, by increasing the critical heat flux, CHF, as well as the heat transfer rate in nucleation film boiling is augmented.

A beneficial aspect of EHD phenomenon is the suppression of film boiling on hot surfaces. Nucleation film boiling generally occurs with much more difficulty in the interior of a uniform substance such as liquid carbon dioxide, by a process called homogeneous nucleation. Liquids cooled below the maximum heterogeneous nucleation temperature (melting temperature), but which are above the homogeneous nucleation temperature (pure substance freezing temperature) are said to be supercooled. The creation of a nucleus implies the formation of an interface at the boundaries of the new phase. Some energy is expended to form this interface, based on the surface energy of each phase. If a hypothetical nucleus is too small, the energy that would be released by forming its volume is not enough to create its surface, and nucleation does not proceed. As the phase transformation becomes more and more favorable, the formation of a given volume of nucleus frees enough energy to form an increasingly large surface, allowing progressively smaller nuclei to become viable. Eventually, thermal activation will provide enough energy to form stable nuclei. These can then grow until thermodynamic equilibrium is restored. 'Film boiling' on very hot surfaces is believed to be stabilized by spontaneous nucleation phenomena, which produces regions having low heat transfer (i.e., vapor pockets) and thermally insulated the pure fluid. This also occurs in machining fluids, where the coolant contacts the hot tool or workpiece surfaces, in particular the cut zone, and instantly forms a thermally-insulative vapor layer which disrupts beneficially cooling effects and prevents lubricants from entering the boundary layer. EHD can be used to disrupt or destroy these boundary layer films thereby dramatically increasing heat transfer and lubrication in machining.

EHD has been exploited commercially to enhance machining. For example, in U.S. Pat. Nos. 3,670,606 and 3,862,391, and more recently in U.S. Pat. No. 7,198,043, all exploit EHD phenomenon using high voltage to enhance natural heat convention and transfer from hot cutting tool surfaces. However both of these techniques require the employment of separate HV electrodes attached to workpiece and cutting tool or indirect contact with an electrostatic nozzle. The fluid (atmospheric gas) heat transfer is improved, but it offers little in heat capacity due to its small mass. Moreover, no additional boundary layer lubrication is provided between the workpiece and tool surface (i.e., cut zone). In U.S. Pat. No. 3,747,284, liquid coolants are electrostatically charged (without producing an arc) with an accompanying electric field produced between the spray nozzle and workpiece. The limitation of this approach is that the EHD-enhanced machining coolants, regardless of improved heat transfer coefficients provided therein, do not have sufficient boundary layer velocities in many cases to enter the cut zone. Moreover, employing bulk liquids for flood cooling is wasteful and creates waste by-products which must be managed. Still moreover, these approaches improve machining heat removal and retard heat build-up only in a macroscopic sense; tool bodies, workholding fixtures and the workpiece itself. The reactive boundary region involving the cutting interface between the tool, chip and workpiece (where the heat is generated) indirectly benefit from the EHD effect.

The prior art is replete with examples of the role of oxygen (and surface oxidation) to reduce (or increase) cutting force and improving (or decreasing) surface finish during cutting. According to Rehbinder, the immersion of wires of certain metals in non-polar paraffin containing a little oleic acid increases the rate of flow of the metal (cadmium) under a given stress and increases the electrical resistivity. His experiments show that the mechanical effect can be obtained with single crystals of cadmium if the surface is contaminated by a thin oxide layer, which is known to increase the critical shear stress, but not if the surface is clean. The "Rehbinder effect" is attributed to the disruption of the hardening surface layer by the active agent (i.e., oxygen) and not to penetration into the metal. In metal cutting applications such as ferrous metals, the iron oxides formed on these metals during cutting are beneficial. However thermal management is still required to maintain optimal cutting temperatures and additional chemistry may be required to lower critical stress of cutting. For example, ozonated air (direct oxygenation of the cut) can enhance C45 ferrous metal cutting operations, due primarily to the lubricating benefit afforded iron oxides thus formed. However typically, newly oxidized metal surfaces are mostly beneficial for promoting the proper surface chemistry for a secondary lubricant and additives to perform their functions properly. In some materials such as stainless steels, nickel and chromium do not form oxides rapidly and if formed can be detrimental to machinability due to the higher shear stresses of chromium and nickel oxides. Moreover the presence of other extreme pressure stress and strain reduction compounds such as sulfur may be needed for a particular cutting operation.

As such, there is a present need for an improved cooling and lubricating method that can be adapted to or dynamically "tuned" in-situ to optimize the cutting conditions of a particular machining application, and for particular cutting tools and coatings and for the improved machining, cutting or grinding of a variety of advanced materials under flood, dry and near-dry conditions. It is, therefore, a primary object of this invention to provide a novel method and apparatus for the functionalizing an oil (bio-based preferred) in-situ with oxygen, and non-toxic organic sulfur too (as an extreme pressure agent), and controllable oxygenation and sulfurization levels of same. A secondary object of the present invention is to provide an improved method for delivering and applying said "oxygenated oils" using a more effective, economical and versatile cooling-lubricating apparatus to meet the demands of a diversity of machining, cutting, grinding operations and which provides a multitude of performance, worker safety and environmental benefits in a wide variety of machining applications.

SUMMARY OF INVENTION

The present invention describes a chemically-assisted machining process that converts conventional lubricant chemistries to produce reactive oxygenated species that accelerate the formation of friction-reducing boundary layer lubrication during cutting operations—termed "Ozonolytic Machining". The new type of cooling-lubricant chemistry described herein is based on chemical reactions between unsaturated bio-based oils and alcohols, and other types of machining lubricants, containing carbon-carbon double or triple bonds, with ozone gas to form variously reacted or polymerized ozonides—termed "super-oxygenated fluids, oils or alcohols, aldehydes or ketones", "sulfurized ozonides", and "super-oxygenated gels" herein.

Preferred fluids for use with the present invention include unsaturated long chain oils or alcohols containing one or more carbon-carbon double bonds ($>C=C<$) which are derived from oleo or bio-based compounds, or blends of same. Preferred organic sulfur additives for use with the present invention include dimethyl sulfoxide (DMSO) and dimethyl sulfone ($DMSO_2$).

Instant super-oxygenated or sulfurized fluids derived from the present invention may be applied as instantaneous flood or (preferred) MQL coolant-lubricant formulations in turning, drilling, reaming, milling, grinding and dicing operations among others; and on materials including composites, ceramics, metals, among others. Ozone gas and sulfur have been used in the prior art as a means for treating lubricants to modify $C=C$ double bonds to form oxygenated carboxyl and hydroxyl functional groups as a means for forming stable emulsions with water and surfactants. It should be noted that heretofore the chemical process intermediates formed during such processing—for example ozonides and oxyanions—have not been used in machining conventional lubricant formulations due to their unstable and reactive nature. For example, organic ozonides will begin to absorb moisture and hydrolyze to carboxylic acids immediately. In another example, a study involving ozonated olive oil showed that after freezing and then melting the ozonated oil 6 times, 1,2,4 trioxalane content decreased 87%-95% (Miura). This particular study also showed that the ozonated oil had a shelf life of only 3 months at room temperature. This translates into unacceptable stability and shelf life with transport and storage control challenges for the commercial lubricants industry. The present invention resolves these constraints by forming the more beneficial and reactive ozonide- or trioxalane bearing machining fluid in-situ, following which it is used directly within the machining process.

Moreover, it is not an attractive option to utilize ozone gas directly as an additive into machining fluids and processes since it is potentially hazardous to workers and corrosive to machining equipment. Firstly, the solubility of ozone in lubricants is only a little higher than oxygen. Also using high concentrations of free ozone gas within machining equipment can corrode internal surfaces of coolant fluid channels, and steel tooling and fixtures. In the present invention, the trioxalane or ozonide functional group is chemically attached to the oil molecule. The ozonide itself is transported safely to the cutting zone, cutting tool and workpiece, whereupon it breaks down under stress to liberate the oxygen atoms. In addition, inert gases may be used in the present invention to sparge residual ozone gas from reacted solutions to eliminate all traces of free ozone gas if desired.

Moreover the present invention describes the production of a novel bio-based machining gel, paste or concentrate (termed a "super-oxygenated gel" herein) using the present invention which can be transported and stored similar to 2-part epoxy bonding formulations and kept stable in a refrigerator (i.e., up to 2 years). Super-oxygenated gels (including sulfurized versions of same) can be diluted with other cutting lubricants or used directly, for example as brush-on tap and die, drilling and reaming lubricants for horizontal machining applications. In another example, Super-oxygenated gels may be used as an additive into another cutting or stamping fluids to increase their levels of oxygenation and activity. The cross-linking or polymerization of bio-based oils during extended ozonation and sulfurization reactions of the present invention thickens the oil to a point where no additional thickening agent is required to utilize the formulation as described above. Olive oil, due in part to its high smoke point, is an excellent example of a source of super-oxygenated gel in the present invention.

In-situ formulation and use of super-oxygenated fluids using only natural, renewable and biodegradable compounds is a very novel and attractive option. Bio-based ozonides and oxyanions produced by the same offer both high chemical reactivity and machined surface-tool-chip surface activity due to the presence of the reactive triozonide ring (i.e., 1,2,4 trioxalane) and oxygen ions intermediates formed during the substitution of $>C=C<$ double bonds. Moreover the intermediates formed ($O_2$ anions or oxyanions) provide a bridging means for attaching trace amounts of other beneficial moieties on-the-fly—for example sulfur-based functional groups—when such constituents are present. Still moreover, ozonation of bio-based lubricating oils produce alcohol and free fatty acids (FFA) which enhance (vis-à-vis reactions with oxygen radicals) boundary layer reactivity and lubricity. As discussed in the prior art, ozone (ionized gases) have been used to enhance dry machining of metals. Constraints and limitations of ionized gases and ozone associated with the prior art include lack of versatility in applications requiring more complete boundary layer lubrication, volatility (most of the ionized species are lost during transit to the cutting zone), and nuisance odors from excess ozonation. By contrast, the fluids of the present invention can be saturated with ozone as compared to atmospheric applications of ozone.

Using the present invention, process engineers, machinist and technicians can use readily available and low-cost bio-based cutting oils and alcohols, for example formulated from soy-based lubricants or oleyl alcohol, among many other suitable fluid candidates. These compounds are treated in-situ to impart super-oxygenation when used (preferably) as MQL in cutting operations, or polymerization to super-oxygenated gels suitable for use in horizontal machining operations or as oxygenation additives for other cutting fluids. Exemplary bio-based oils including castor oil, soybean oil, rapeseed oil, olive oil, jatropha oil, and many other examples of bio-based compounds containing double or triple bonds can be used to produced oxygenated feed stocks for machining operations; cold stored and blended as mixtures using the present invention. For example, a method taught herein is the use of soybean oil which is treated using the present invention to produce a thick super-oxygenated concentrates that can be optionally sulfurized and used as tapping gels, applied with a brush. Alternatively, the super-oxygenated machining gels may be diluted with additional soybean oil or other compounds such as oleyl alcohol to produce super-oxygenated blends. Synthetic esters and other products containing >C=C< may also be used with the present invention. For example, a useful compound that contains an ozone-reactive double bond on the end of the molecule is 1-decene, an olefin, which is attractive because of its low toxicity, low flammability and low freezing temperature (−66 deg. C.). 1-Decene will react with ozone to form the ozonide, decanone and decaldehyde; all useful oxygenated species for practicing the present invention.

The present invention is superior to merely sparging or pumping air, pure oxygen gas, or even carbon dioxide, into cutting oil; which is more or less equivalent to conventional oil-air and oil-$CO_2$ aerosol MQL spray processes. Oxygen and most common gases exhibit limited solubility in fluids. Moreover, oxygen and other oxygenated gases exhibit much lower reactivity as compared to ozone. Ozone has an oxidation potential of 2.07 V, compared to 0.81 V for oxygen; 2× greater oxidizing power including the oxygen radicals formed therefrom. Moreover, ozone is more reactive than oxygen or carbon dioxide, exemplified by comparing bond energies. Ozone has oxygen-oxygen bond energy of 364 kJ/mole; compared to 498 kJ/mole for oxygen and 783 kJ/mole for the carbon-oxygen bond energy of carbon dioxide. Based on this comparison, ozone is 30% more reactive in the cut zone than oxygen and 54% more reactive than carbon dioxide. Ozonides of the present invention are basically trioxalane molecules inserted into long chain lubricant backbones vis-à-vis reactions with >C=C< double bonds. Moreover, super-oxygenated compounds of the present invention serve as lubrication accelerants. Similar to other chemical process accelerants, small amounts of super-oxygenated oil molecules can produce marked improvements in machinability by lowering activation energy of boundary layer lubrication reactions. Oxygen-bearing organics react more quickly in the cut zone and accelerate the breakdown of less oxygenated or non-oxygenated components and incorporation into boundary layer lubricating films.

In a first aspect of the present invention, reactive oxygen atoms are chemically grafted (in-situ) onto the chemical backbone of an unsaturated bio-based oil or alcohol to produce a fraction of super-oxygenated oil or alcohol that can be used as a MQL or flooded lubricant. Preferred unsaturated organic compounds for use in the present aspect include bio-based fatty esters and alcohols. It is believed by the present inventor that heretofore ozone has not been used as a machining fluid reactant in-situ to formulate highly reactive coolant-lubricant compositions comprising oil, ozonides, dissolved ozone, oxygen, ions and radicals. Moreover, oxygenation and ionization processes of the present invention are time- and dose-dependent; controllable so that a particular level oxygen (and oxygen reactivity) can be generated (from zero to saturation) within an unsaturated oil or alcohol lubricant. Still moreover, mixtures of unsaturated oil lubricant and small amounts of non-toxic dimethyl sulfone can be combined to produce powerful extreme pressure lubricant chemistries. Numerous unique and bio-based lubricating combinations comprising super-oxygenated lubricants can be developed on-the-fly using the present invention, including straight super-oxygenated organic formulations, super-oxygenated gels as well as semi-aqueous microemulsions containing one or more organic compounds capable of being selectively super-oxygenated in the presence of water, salts, surfactants and other beneficial additives. Used in cooperation with machining and metalworking processes, the present invention is termed herein as "Ozonolytic Machining", "Ozonolytic In-Process Dressing", or OLID, and "Ozonolytic Metalworking".

Another aspect of the present invention is the employment of a unique electrostatic charging (ESC) method and apparatus for more efficient and effective delivery of novel oxygenated MQL fluids of the present invention. A novel coaxial electrode-in-capillary design is employed to charge and ionize the oxygenated fluid and clean dry air, respectively, during transit and ejection from a MQL spray nozzle. Because the electrode-in-capillary is coaxial with a grounded propellant tube, the electrode-in-capillary also charges and ionizes the propellant gas flowing there through during transit (vis-à-vis silent electrical discharge). This eliminates the scavenging or dilution of beneficial ions and charges that would occur if charged oxygenated fluids were mixed into a flowing charge-neutral propellant gas. Streaming currents induced by the electrode-in-capillary design can reach several thousand volts or more. Charge generation typically strengthens with increasing flow, decreasing fluid conductivity, and increased viscosity. Finally the charging electrode wire extends a short distance out from within the capillary and grounded nozzle exit, which projects a strong electrostatic field (a non-arcing, fluid/surface ionizing electric field) toward the grounded cutting zone components—the intersection of the tool-chip-workpiece—which improves boundary layer oxygenated fluid-cutting surface interactions as discussed herein.

Related to this aspect of the present invention is the use of the electrode-in-capillary as a novel coaxial machining fluids oxygenation device. A thin wire electrode located coaxially within a dielectric fluid transport capillary tube transporting a mixture of air-oil or air-alcohol. This device is used to generate ozone from oxygen within the machining fluids-air composition through the production of a corona discharge within the fluid mixture. An additional aspect of this oxygenation apparatus is the production of electrostatically-charged fluids. Electrostatically charged fluids produce more uniform oil droplet distribution in aerosol sprays (MQL) and charged droplets are strongly attracted to grounded cutting surfaces which offset strong centrifugal forces common to many cutting operations. Electrostatic charging (positive or negative) of the super-oxygenated fluids of the present invention create additional ions and electric wind between the spray applicator and grounded cutting surfaces which allow for more efficient interaction between the super-oxygenated species and bio-based oil components and the cutting zone. Electrostatics and associated electric fields present in super-oxygenated cooling-lubricating sprays employed in the present invention improve penetration, boundary layer lubrication and heat flow within the cutting zone, in particular the interfacial surfaces between cutting tool, chip and workpiece surfaces during machining operations.

Still another aspect of the present invention is the novel use of a Vortex tube to produce cold clean dry air fluid streams for use in different operational aspects of the present invention. First a clean dry cold stream produced by the Vortex tube is fed into an exemplary conventional coaxial ozonator, for example as described in U.S. Pat. No. 5,124, 132, to produce an ozonated air stream which is then bubbled through a bio-based fluid such as soybean oil or derivatives such as oleyl alcohol for a pre-determined period of time to produce a concentration of super-oxygenated lubricant. The ozonation of unsaturated oils is exothermic (indicative of ozonide bond formation) and subcooled ozonated air offsets the production of excess heat build-up in the oil or alcohol.

Figure 3:
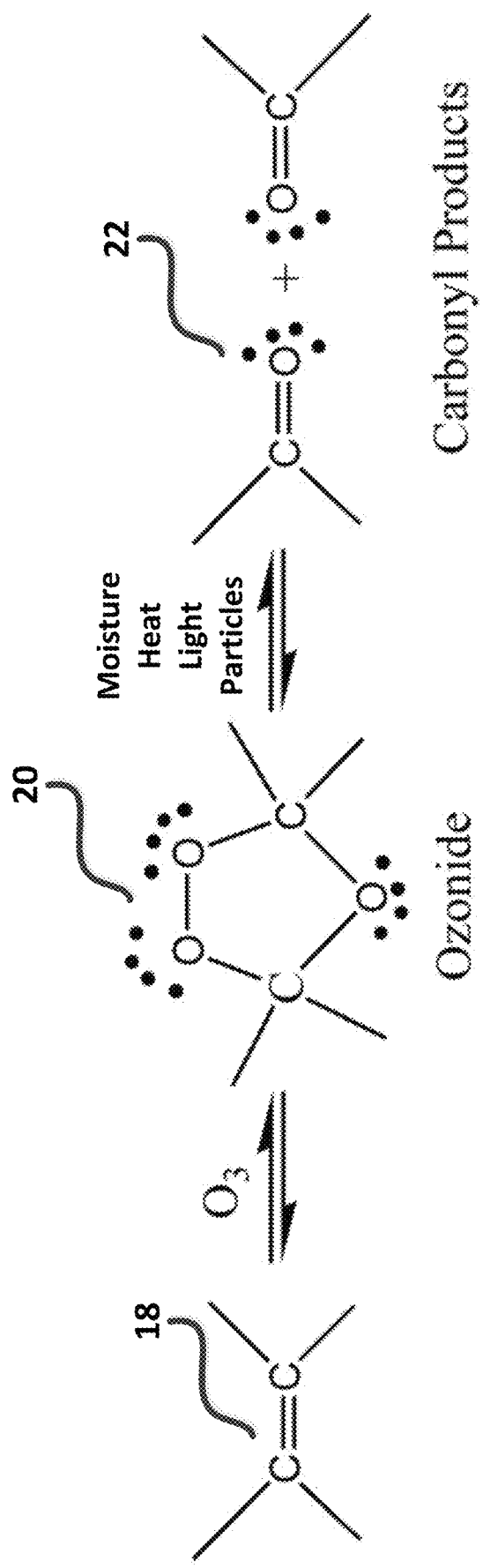

Additionally, subcooled ozonated air cools bio-based fluids which increases viscosity and slows down ozone diffusion and increases ozone retention, solubility and reaction time. This improves ozone reaction kinetics (i.e., contact time and concentration effects). Following oxygenation reactions, the Vortex tube is used to generate a clean dry cold air stream to cool down an air-ozonide aerosol as a MQL spray for cutting operations.

Still another aspect of the present invention is a method for monitoring and controlling oxygen saturation in unsaturated fluids using a viscosity sensor (and computer/software) simultaneously during the production of super-oxygenated compounds.

The present invention is suitable for use with many conventional MQL and flood delivery systems and can be adapted for brush-on, spray, through-tool and through-spindle and for both stationary and portable machining tools.

Still another aspect of the present invention is the use of dissolved gases in flooded oxygenated fluid applications to boost the removal of machining heat, termed "bubbly flow". Bubbly flow is used with the present invention to assist with the removal of excess cutting heat and the flotation of microscopic machining debris from the cutting zone in applications. Moreover, specially designed compositions of machining fluids are chosen which are highly soluble in carbon dioxide to provide high solubility of carbon dioxide in the cutting fluid for both maximum bubbly flow and substrate separation. Using this scheme, which is the subject of a co-pending application by the present inventor, a novel self-cooling and self-cleaning closed-loop machining and cleaning system is enabled.

Other objects and features of the invention will be evident hereinafter by reference to the following figures.

FIG. 1—Diagram depicting a generalized oxygenated machining fluid composition triangle.

FIG. 2—Chemical reaction diagram describing the intermediate ozonides and oxyanions used to oxygenate exemplary bio-based oil used in the present invention.

FIG. 3—Chemical reaction diagram describing the formation of trioxalane (an ozonide) and reduction of same.

FIG. 4—Chemical reaction diagram showing a conceptualized reaction of oxyanion by-products of ozonolysis of bio-based oils with an exemplary (and optional) sulfurizing compound.

FIG. 5—Chemical reaction diagram depicting conceptualized reactions of ozone, carbon-carbon double bonds and organic sulfur to form super-oxygenated (and sulfurized) bio-oils and bio-alcohols.

FIG. 6—Diagram showing the general progression of the reaction of ozone with an unsaturated hydrocarbon to form super-oxygenated fluids or a super-oxygenated gel.

FIG. 7—Related to FIG. 6, a table showing the general reaction time of the reaction of ozone with an unsaturated hydrocarbon to produce a level of saturation (i.e., oxygenation) in super-oxygenated fluids or a super-oxygenated gel.

FIG. 8—Diagram showing the increase of viscosity due to the reaction of ozone with an unsaturated hydrocarbon.

FIG. 9—Diagram showing the application of super-oxygenated and optionally electrostatically charged machining fluids as a spray (MQL or Flood) into a conceptualized cutting zone.

FIG. 10—Related to FIG. 9, a diagram showing the conceptualized reactions of super-oxygenated and (optionally) sulfurized machining fluid constituents with reactive metal surfaces.

FIG. 11—Schematic showing an exemplary MQL system for producing and applying in-situ super-oxygenated machining fluids.

FIG. 11*a*—Schematic showing the use of a membrane to selectively generate an oxygen rich or nitrogen rich gas stream for use with the present invention.

FIG. 12—Schematic showing an exemplary MQL system for producing and applying in-situ super-oxygenated machining fluids.

FIG. 13—Schematic showing an exemplary MQL system for producing and applying in-situ super-oxygenated machining fluids.

FIG. 14—Schematic showing an exemplary MQL applicator for transporting, forming and projecting an electrostatically-charged super-oxygenated machining fluid spray.

FIG. 15—Schematics showing exemplary coaxial and coaxial-Coanda nozzles for forming and projecting super-oxygenated machining fluid sprays.

FIG. 16—Schematic showing an exemplary ozonation system for producing a super-oxygenated machining gel or concentrate.

FIG. 17—Tables showing three types of exemplary oxygenated machining fluid compositions for use with the present invention.

FIG. 18—Schematic showing an exemplary MQL system for producing and applying in-situ super-oxygenated machining fluids.

DETAILED DESCRIPTION OF INVENTION

FIG. 1 is a diagram depicting a generalized oxygenated machining fluid composition triangle. Referring to FIG. 1, exemplary compositions generated in-situ and applied in accordance with the present invention comprise combinations of ozone (2) and unsaturated bio-based compounds (4), and optionally organic sulfur compounds (6) as extreme pressure adjuncts, to form exemplary functional groups such as trioxalane (8) derived from the reaction of ozone (2) with the carbon-carbon double bonds contained on unsaturated hydrocarbons. Exemplary unsaturated hydrocarbons for use with the present invention are preferably natural or bio-based oils or alcohols. Preferred machining oils may include soybean oil, castor oil, olive oil, rapeseed oil, jatropha oil, corn oil, safflower oil, including commercial machining fluid formulations derived from same, among many others. Preferred machining fluid alcohols comprise long chain alcohols derived from bio-based oils, for example oleyl alcohol and ricinoleyl alcohol, among others. Optional organic sulfur compounds for use in the present invention include dimethyl sulfoxide (DMSO) and dimethyl sulfone ($DMSO_2$), a natural and safe organic sulfur compound. Other types of additives not shown in FIG. 1 may be used with instantaneous oxygenated compositions of the present invention, including anti-foaming agents, dispersants, surfactants, extreme pressure agents such as fluorinated materials, water and carbon dioxide, among other beneficial machining process adjuncts. Thus the present invention provides a novel method for forming and delivering an instantaneous MQL (air-oil aerosol) or flood composition comprising highly reactive organic oxygen bearing fluids and dissolved ozone, dissolved oxygen, and additional beneficial and engineered chemistries which include organic sulfur.

FIG. 2 is a diagram describing the intermediate ozonides and oxyanions used to oxygenate exemplary bio-based oil used in the present invention. Referring to FIG. 2, the reaction of ozone with the carbon-carbon double bond (10)

of the oleate fatty acid backbone of soybean oil results in the rapid formation of primary and reactive ozonide structure (12), which rapidly breaks up into oxyanions (14) and into a secondary ozonide structure called trioxalane (16). It is this unstable compound that is used as a source of reactive oxygen in the present invention. Now referring to FIG. 3, the carbon-carbon double bonds (18), present at one or more locations on the unsaturated fatty acid segments of bio-based oils, are reacted with ozone in the present invention to form a (time/ozone-concentration) controllable fraction of trioxalane (20) in-situ. As shown in FIG. 3, ozonide-based fluids are too unstable to economically produce, transport and store commercially because they readily reacts with moisture, heat, light and particles to form various carbonyl by-products (22). However it is this reactivity that is the basis for improved cutting zone oxygenation and machinability in the present invention due to the presence of all of these reactive elements during a cutting operation.

Figure 2:
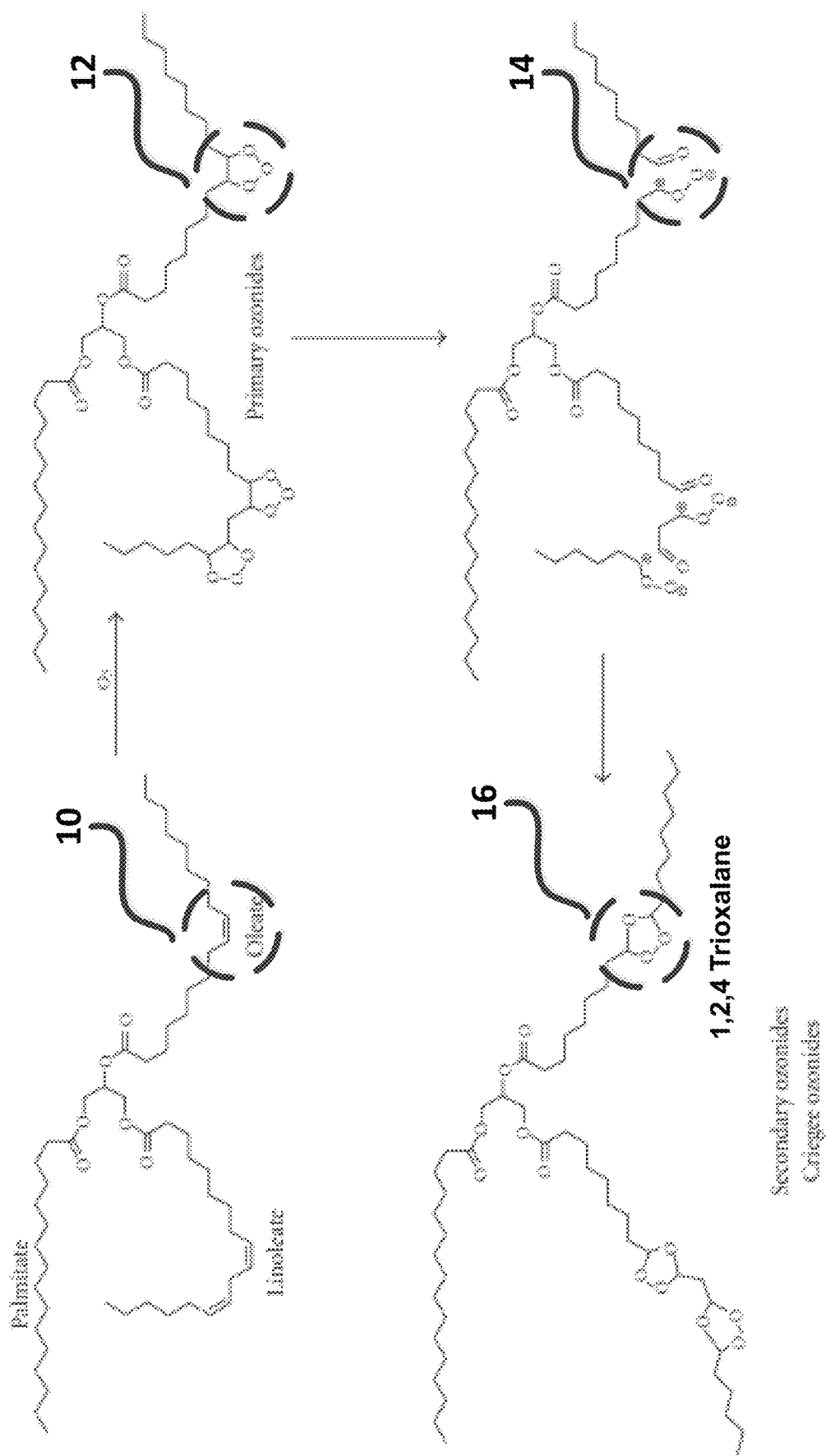
Figure 4:
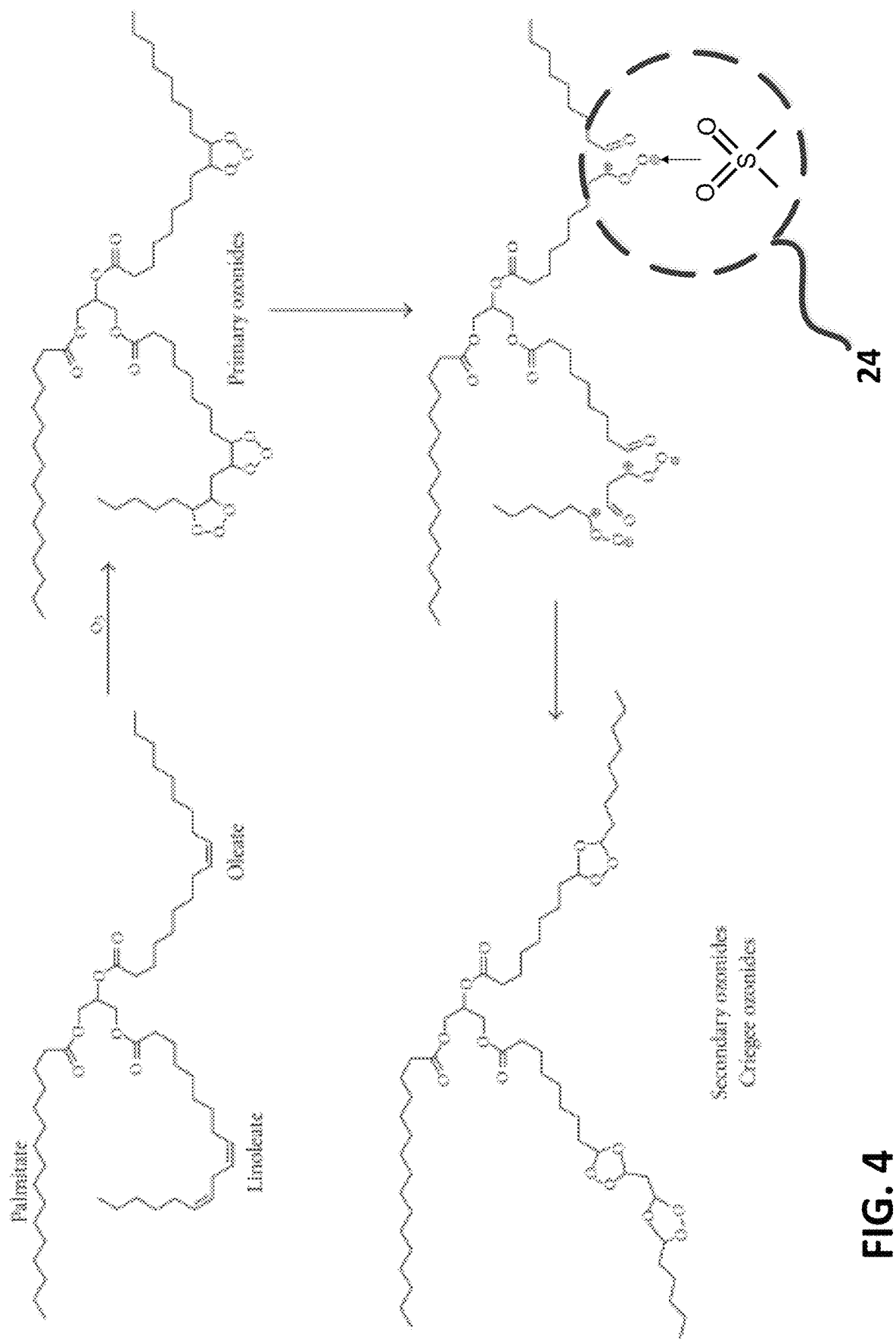

As described under FIG. 1, optional organic sulfur compounds such as DMSO2 may be dissolved into bio-oil or bio-alcohol to form sulfurized compositions. Returning to the same bio-oil structure depicted under FIG. 2, FIG. 4 describes a conceptualized reaction of oxyanion intermediates with the exemplary DMSO or DMSO2 compounds to form exemplary sulfur-bridged ozonides (24) for use as safe extreme pressure adjuncts in the present invention. Other extreme pressure compounds such as perfluoroalkyl polyether (PFPE) may also be used in compositions of the present invention. Such compounds, in cooperation with oxygen, are required to form suitable metal-oxide/metal-sulfide foundations for proper boundary layer lubrication, for example during the machining of super-hard steels or ceramics.

Figure 5:
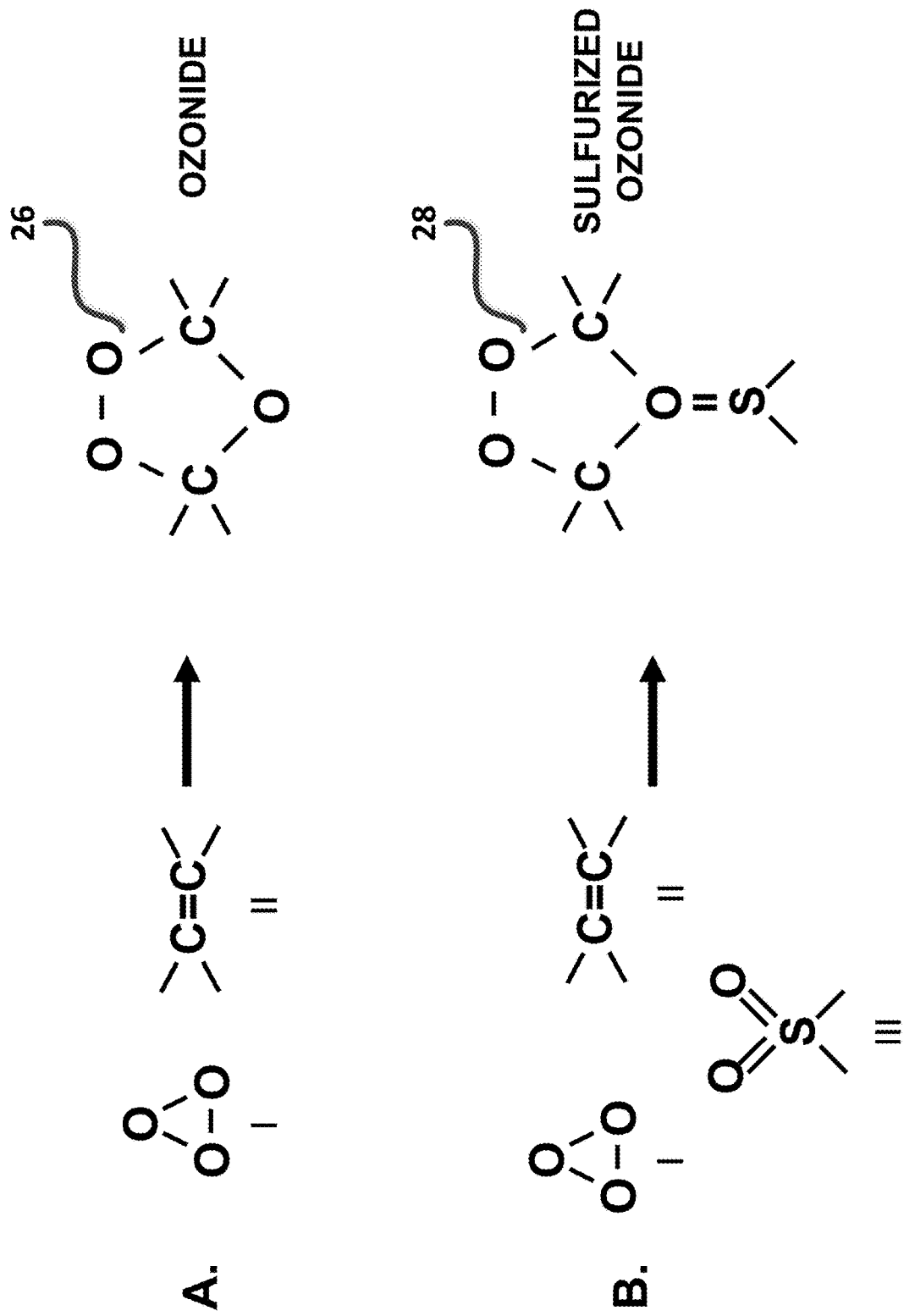

FIG. 5 summarizes the basic functional group reaction ingredients and resulting instantaneous lubrication by-products used in the present invention. As shown in FIG. 5(A), reactions of ozone (I) and carbon-carbon double bonds (II) produce an ozonide structure (26), for example trioxalane. As shown in FIG. 5(B), reactions of ozone (I), carbon-carbon double bonds (II), and organic sulfur (III) produce a (conceptualized) sulfurized ozonide structure (28), which can be bonded, coordinated or in the vicinity of the ozonide structure.

Figure 6:
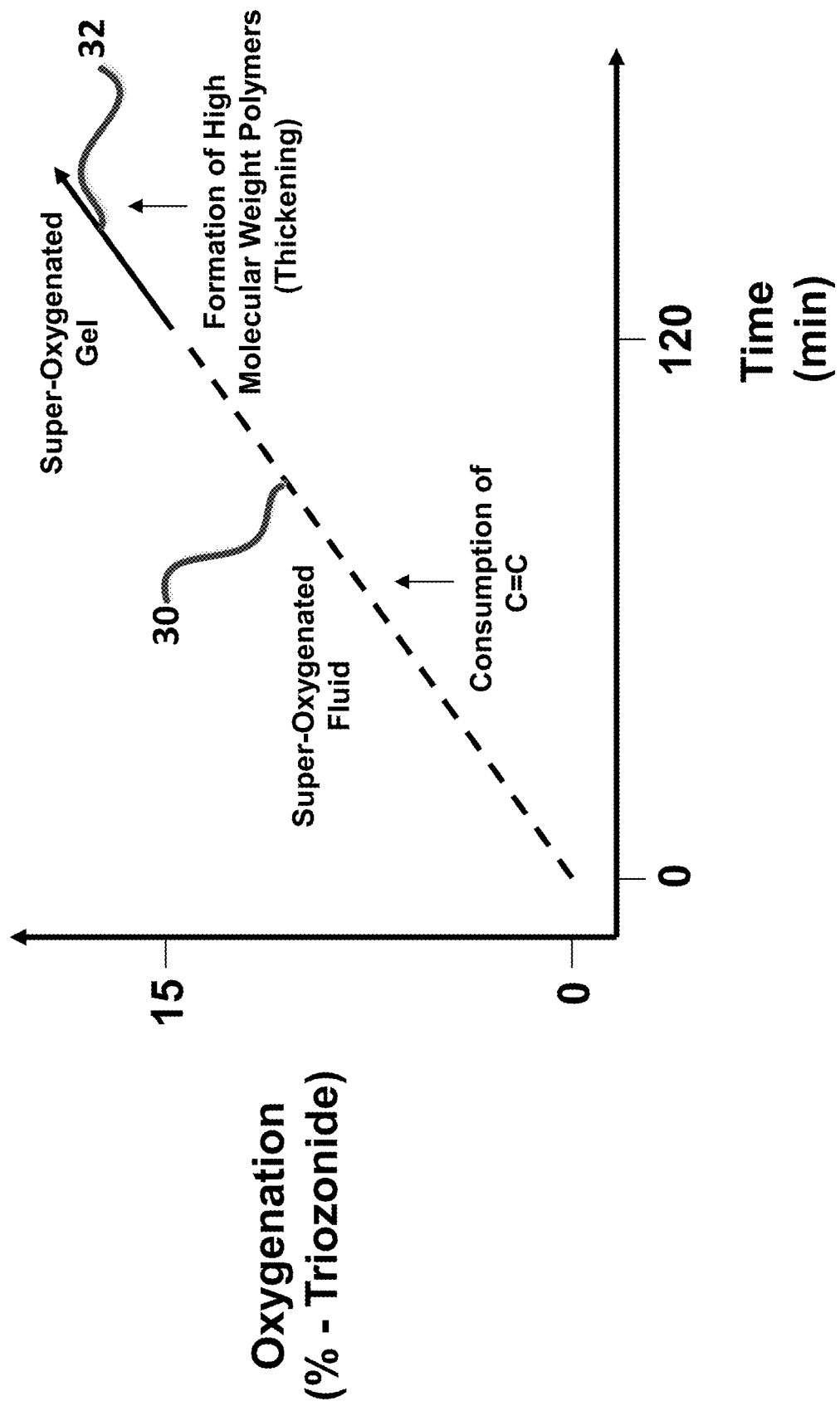

During the process of oxygenating the oils or alcohols of the present invention, including admixtures as already noted, the oxygenation levels (i.e., formation of trioxalane) in the fluid increases as the ozonide structure replaces carbon-carbon double bonds, up to as high as between 15% and 20% by volume. Referring to FIG. 6, the general progression of the reaction of ozone with unsaturated hydrocarbon chains forms first a range of super-oxygenated fluids (30), followed by saturation and cross-polymerization of ozonide-saturated fatty acid groups to form super-oxygenated gels (32). The amount of time required to oxygenate an oil or alcohol is based on the input ozone concentration and moles of carbon-carbon double bonds in the mixture, with higher ozone concentrations producing more rapid saturation rates.

Figure 7:
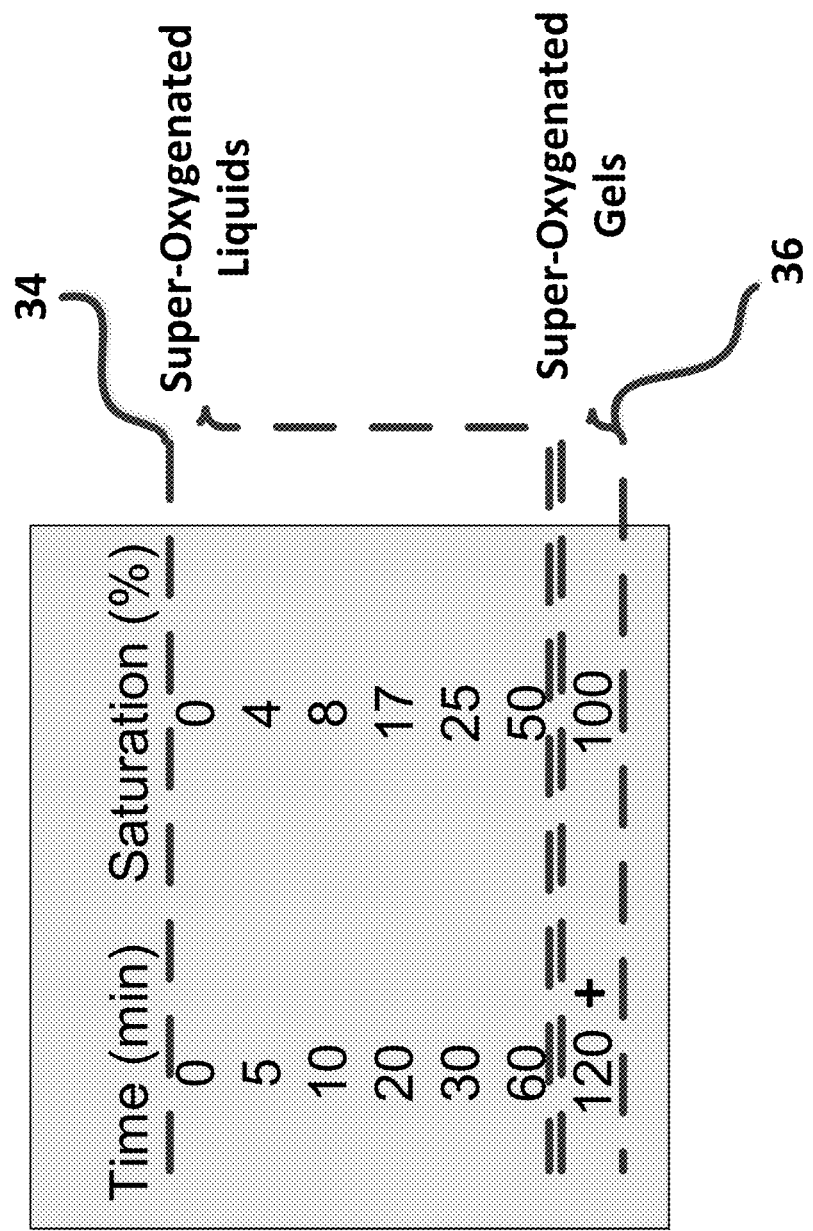

For example as shown in FIG. 7, diffusing 1000 mg/hour of ozone (as air-ozone) through 250 ml of soybean oil will produce near-maximum oxygenation level (i.e., as trioxalane) of the oil in approximately 120 minutes. Thus a range of super-oxygenated fluids (34) can be developed instantaneously using the present invention. A preferred range of instantaneous super-oxygenation fluid levels for use in most machining applications is between 0 and 5%, which is achieved rather quickly with the reaction of ozone with bio-based fluids (less than 6 minutes of total reaction time).

Figure 8:
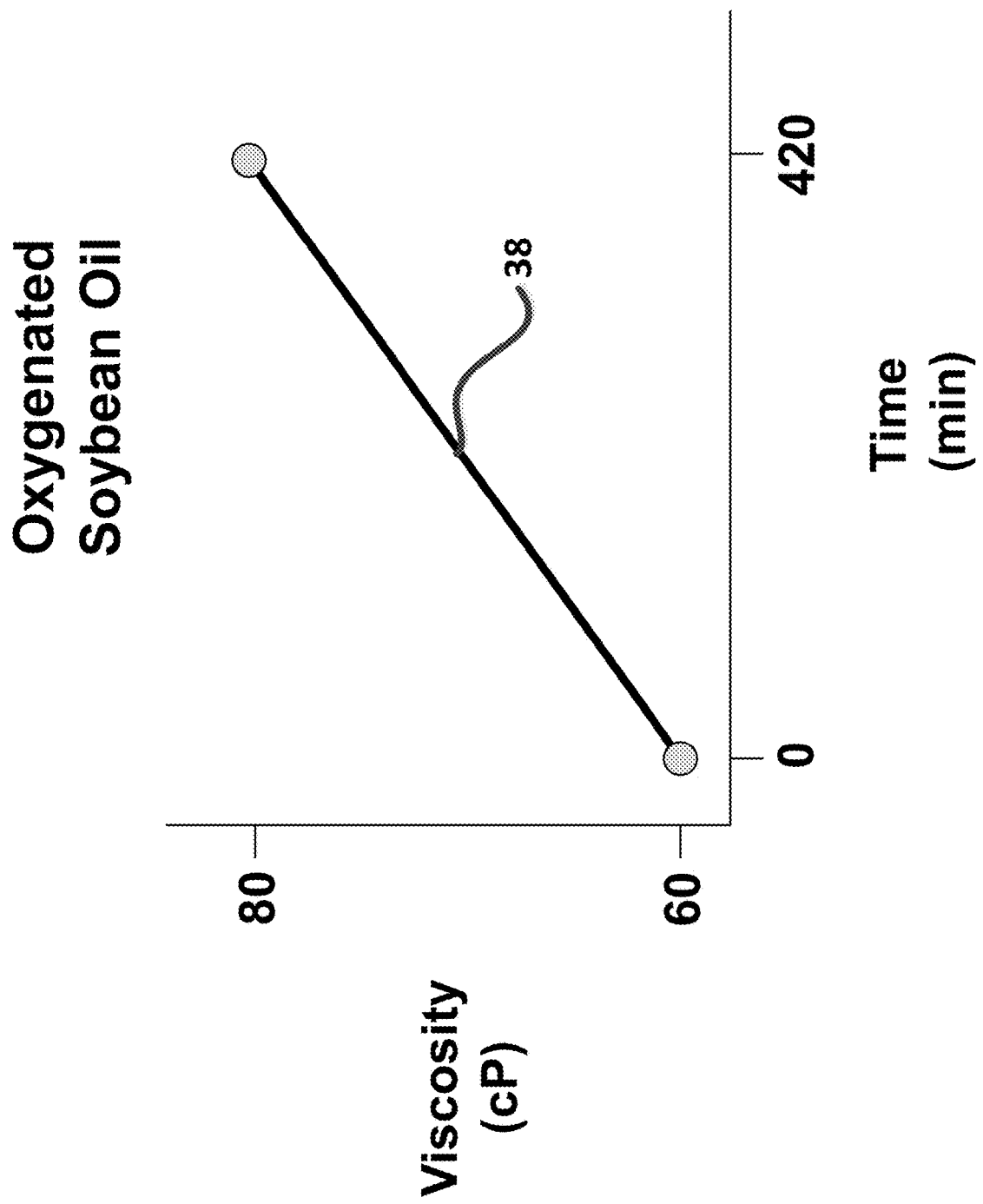

In fact is has been discovered by the present inventor that even trace amounts (less than 2%) of super-oxygenation enhances cutting operations, demonstrated as increased tool life for example. Continuing beyond 120 minutes or more increases cross-linking reactions and polymerization within the super-oxygenated bio-fluid to form super-oxygenated gels (36). This is evidenced by analyzing the viscosity of the bio-fluid during oxygenation, FIG. 8. As shown in FIG. 8, the viscosity of the bio-fluid (i.e., soybean oil) increases (38) during ozonolysis, for example from 60 cP to 80 cP over a period of 420 minutes.

Organic dyes may be also used in machining fluid compositions and ozonolysis reactions of the present invention as a general indicator of oxygenation. For example, an oleic acid and FDA Blue dye (95.5%:0.5% v:v, respectively) mixture was ozonated using the apparatus and method of the present invention. It was observed over time that the bio-based machining fluid color changed from blue to green, green to red, and ultimately to near-colorless (yellowish oil). The color change was a result of the consumption of double bonds in the dye molecules. Thus a spectrophotometer or color chart can be used with a specific dye and dye concentration (having known double-bond concentration) and machining fluid chemistry of the present invention to produce a calibration curve—color versus apparent level of oxygenation; measured in terms of ozone dose mg/hour, time, and ozonide level. For example, for every 1 mole of double bonds consumed, approximately 3 moles of oxygen (based on the ozonide structure) are produced.

Figure 9:
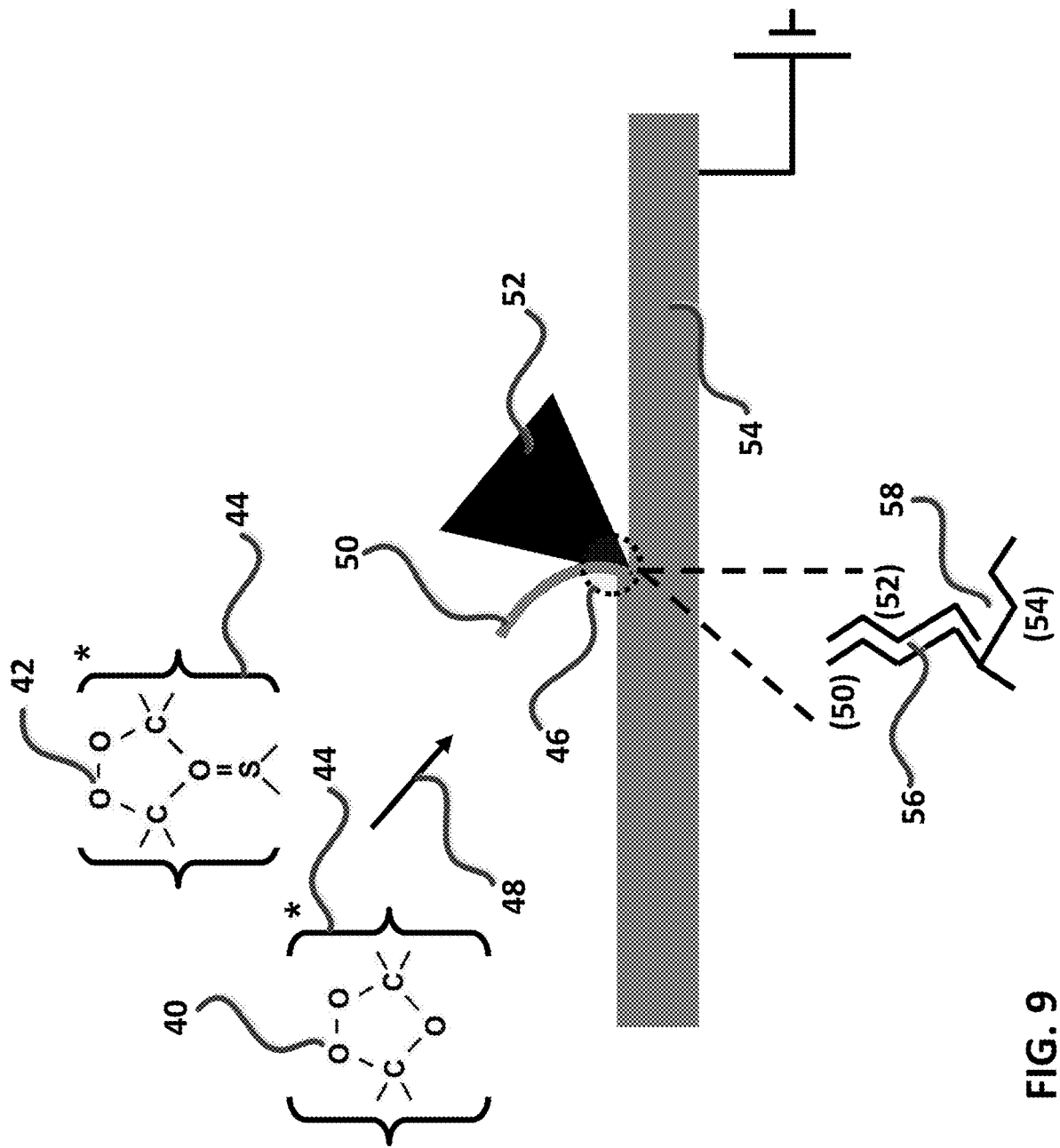
Figure 10:
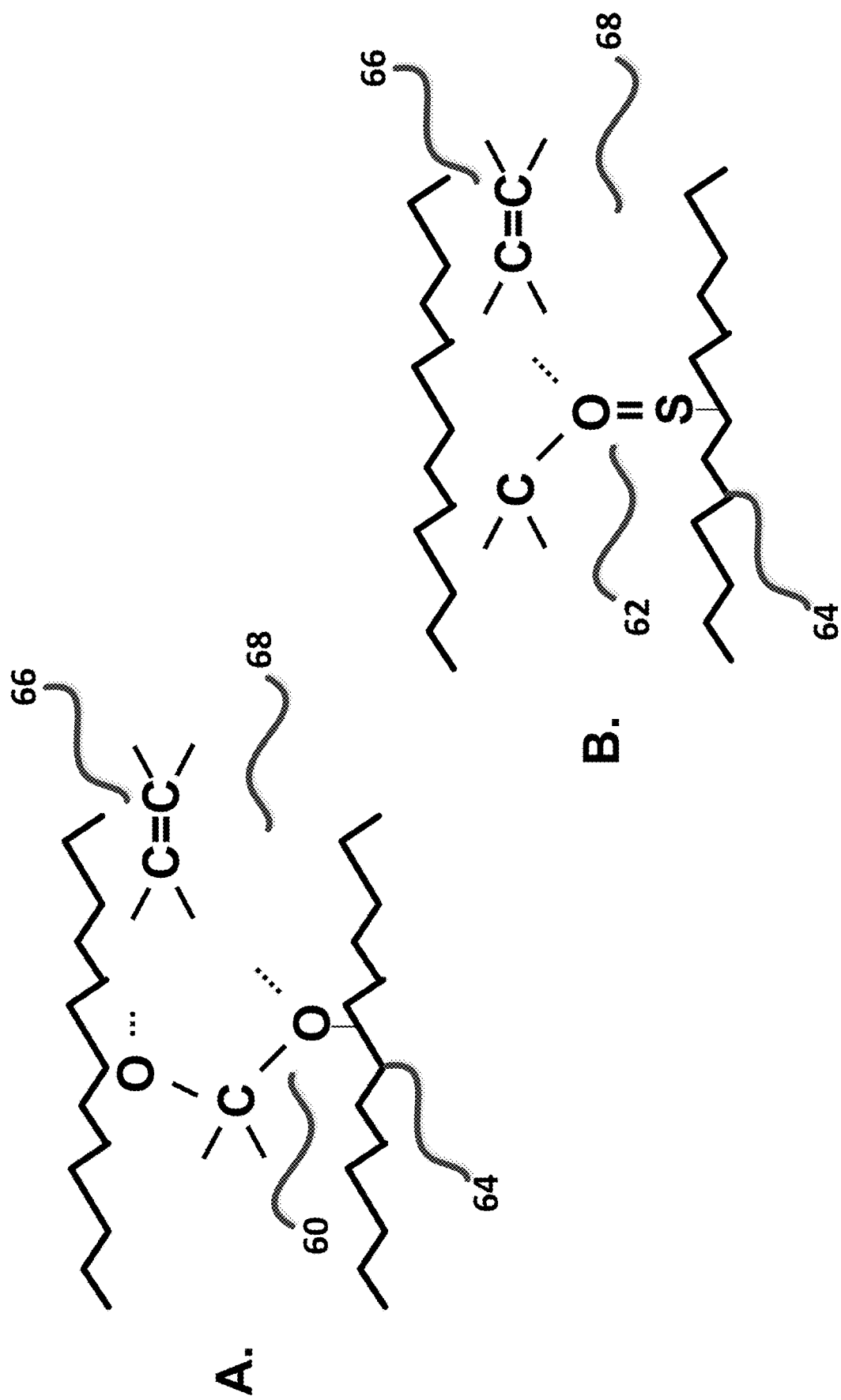

Super-oxygenated fluids of the present invention are useful as MQL and flood cooling-lubricating agents and super-oxygenated gels, including sulfurized compositions, of the present invention are useful for horizontal machining or lubrication applications such as tapping or broaching. As depicted in FIG. 9, super-oxygenated fluids (40), optionally sulfurized super-oxygenated fluids (42), and optionally electrostatically charged fluids of same (44) are projected as MQL or flood sprays into a cutting zone (46) using a propellant gas (48) such as air, ozonated air, or carbon dioxide, to cool and lubricate cut chip (50), cutting tool (52) and grounded workpiece (54). More particularly, the instantaneous super-oxygenated machining fluids of the present invention are used to enhance both cooling and lubrication between the interfacial contact areas bounded by the intersection of the tool face and chip face (56), and flank surface area between tool and workpiece (58). As shown in FIG. 10(A) and FIG. 10(B), bond-breaking reactions between super-oxygenated (60) and (optionally) sulfurized super-oxygenated machining fluid constituents (62), respectively, with juvenile and reactive metal surfaces (64) serve as a critical foundation for allowing the unsaturated bio-based fluids (66) to form beneficial boundary layer lubricating structures on the polar metal surfaces and between the cutting face and flank surface regions (68).

Having thus described the instantaneous oxygenated lubricant formulations and conceptualized reactions of same to for extreme pressure agents and application to cut metal surfaces, following is a discussion of various apparatuses for producing and the applying the present invention in its various aspects as a cooling-lubricating MQL spray.

Figure 11:
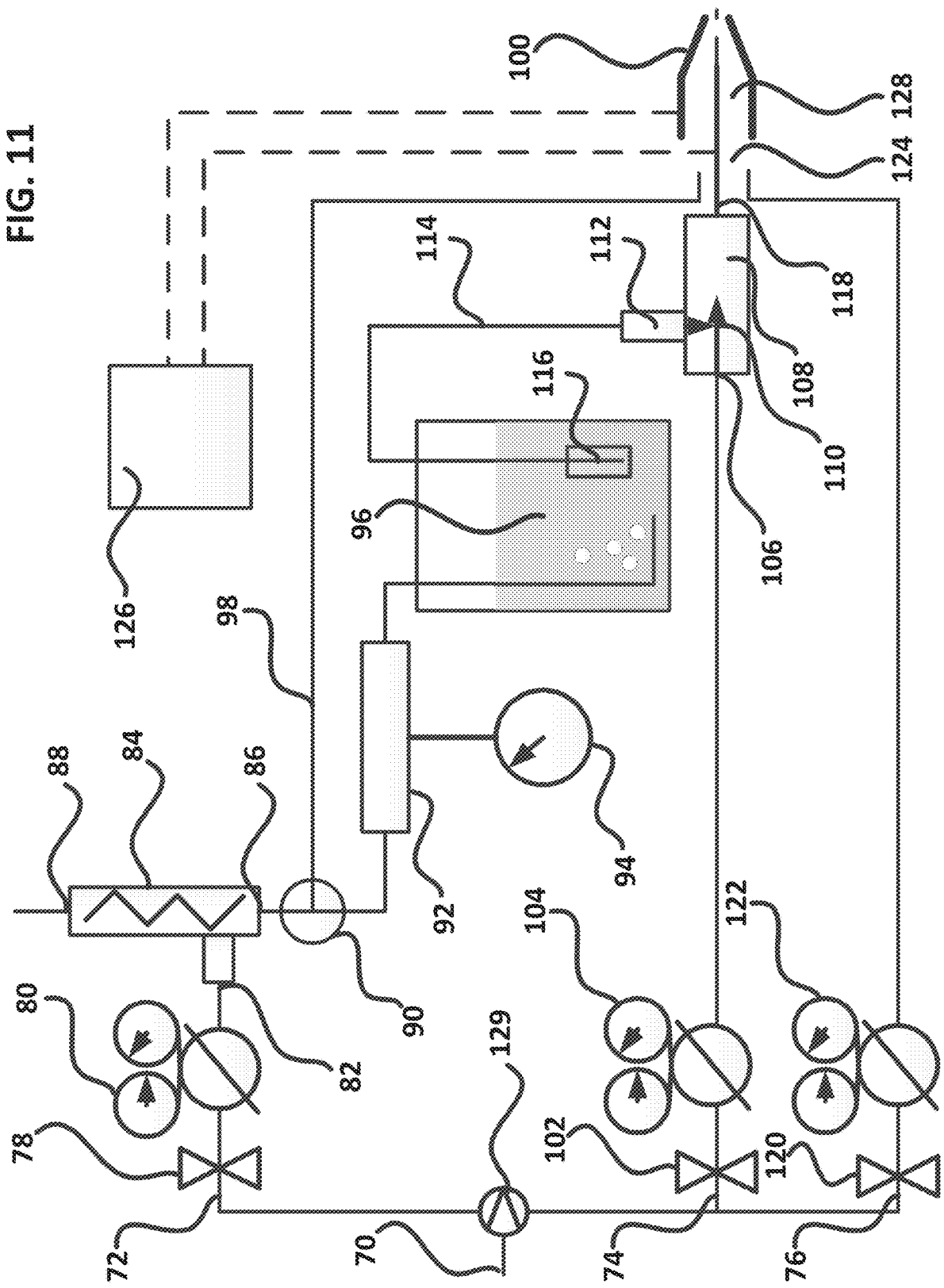

FIG. 11 is a schematic showing an exemplary MQL system for producing and applying in-situ super-oxygenated machining fluids. The exemplary apparatus of FIG. 11 is useful for producing various levels of oxygenation in a particular machining fluid composition prior to application. As shown in FIG. 11, a source of clean, dry air (70), or other fluid such as carbon dioxide, is used to produce three fluid supply streams as follows; vortex-cooled ozonated air-fluid stream (72), oxygenated fluid air stream (74), and propellant fluid stream (76). It should be noted that a gas membrane filter (available from Parker Filter) may be employed to generate an oxygen-enriched clean, dry air for use with the present invention. Use of oxygen-enriched dry air enhances the performance of both ozonation and fluid oxygenation steps of the present invention.

Regarding vortex-cooled ozonated fluid stream (72); clean, dry air is flowed through a valve (78) and pressure regulator (80), and into the inlet (82) of a vortex tube (84). Said vortex tube converts clean, dry air into a super-cooled fraction (86) and a super-heated fraction (88). A vortex tube supply pressure of between 20 psi and 1000 psi generates ample amounts of cold, clean air for a couple of uses in the present invention. A valve (90) is used to direct the clean, cold air to an ozonator (92) and timer (94) for use in oxygenating bio-fluids (96) to produce super-oxygenated fluids for use in the present aspect of the present invention. Alternatively, dry, cold air (86) may be used via valve (90) and a transfer pipe (98) as a cooling adjunct with the exemplary MQL spray applicator (100) of the present invention. The vortex tube can produce various capacities and temperatures of cold air. This is controlled by adjusting the outlet pressure of regulator (80), to between 20 psi and 1000 psi in cooperation with an adjustment of a small heat waste valve (not shown) located on the hot air discharge side (88) of the vortex tube.

Now referring to the oxygenated fluid air stream (74); clean, dry air is flowed through a valve (102) and pressure regulator (104), and into the inlet (106) of an exemplary eductor tube (108). Said eductor tube (108) uses the flow and pressure of the oxygenated fluid stream inlet (110) to create suction on an eductor inlet (112). Super-oxygenated bio-fluid (96) is suctioned via a tube (114) and filter (116) assembly into the eductor tube (108) via eductor inlet (112) and mixed with the oxygenated fluid stream (110) to form a mixture of clean, dry air and super-oxygenated fluid which is transported via capillary tube (118) and into and coaxially through the exemplary spray applicator (100). The oxygenated air stream flowrate and pressure (and hence suction line super-oxygenated fluid injection flowrate) is controlled by adjusting the outlet pressure of regulator (104), to between 20 psi and 1000 psi in cooperation with an adjustment of a small metering valve (not shown) located on the eductor inlet port (112).

Now referring to propellant fluid stream (76); clean, dry air is flowed through a valve (120) and pressure regulator (122), and into the inlet (124) of an exemplary spray applicator (100). The propellant fluid stream flowrate and pressure is controlled by adjusting the outlet pressure of regulator (122), to between 20 psi and 1000 psi.

Figure 14:
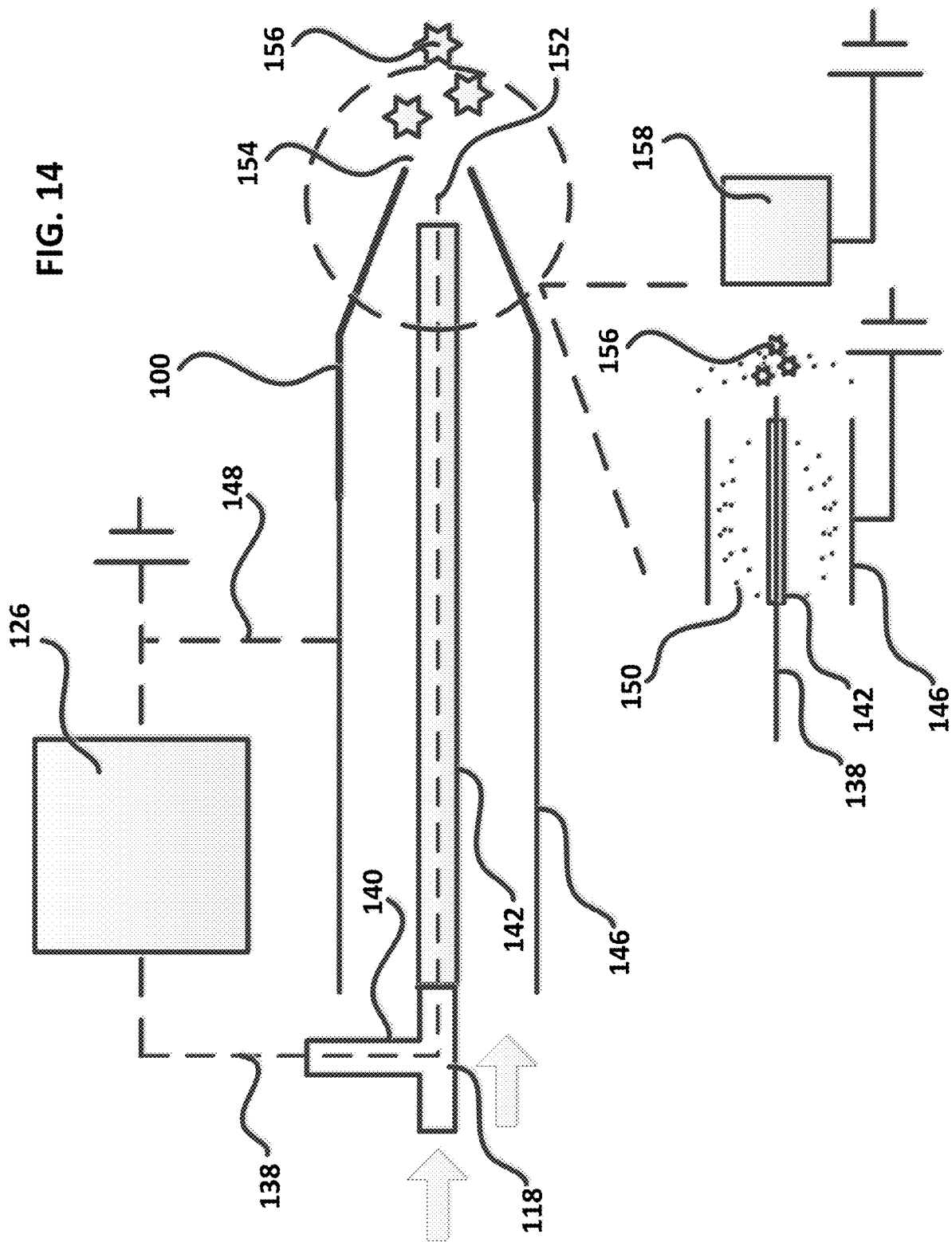
Figure 15:
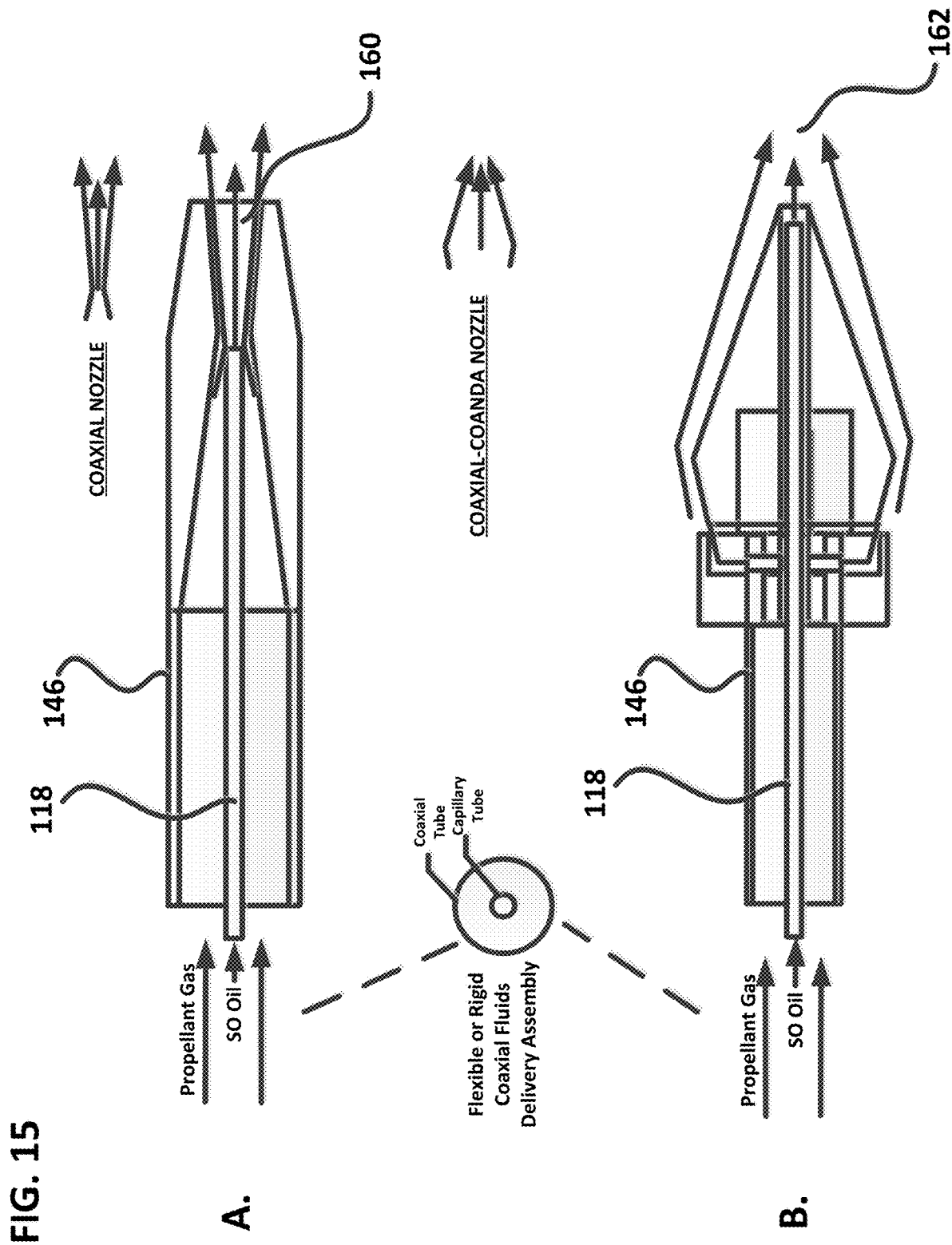
Figure 16:
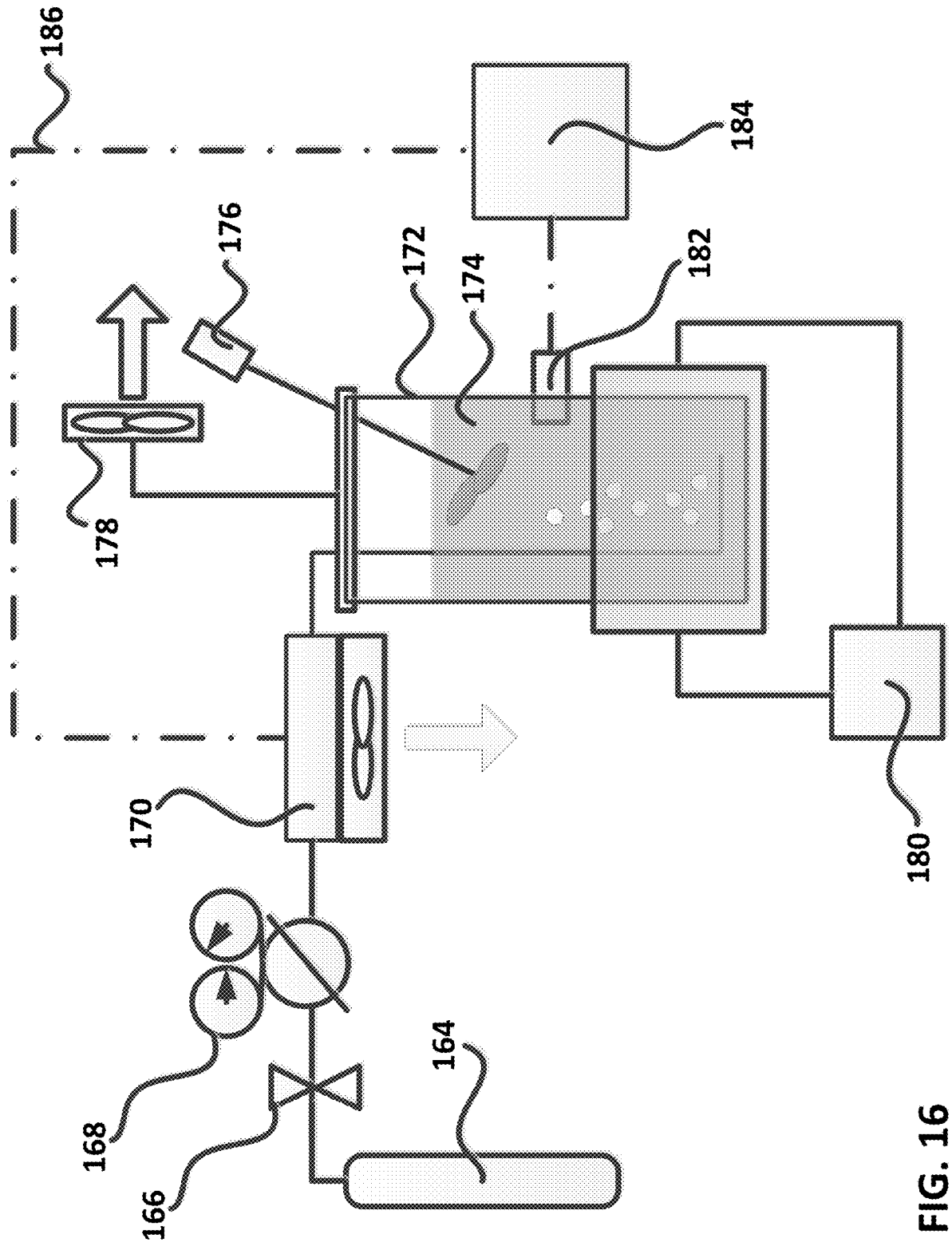

Finally, a power supply (126), which is the same HV power supply which is used to generate a corona discharge in the exemplary ozonator (92), is optionally used to power an electrode-in-capillary assembly, described in more detail under FIG. 14 herein, comprising the coaxial capillary tube (118) containing air and super-oxygenated fluids.

All three fluid streams are integrated into a single exemplary coaxial MQL spray applicator as shown with the oxygenated fluid stream line or capillary (118) running coaxially through the interior of a second propellant tube (128). Also shown, adjunct vortex tube cooled air from pipe (114) may be fed coaxially into the spray applicator to provide additional cooling capacity for the super-oxygenated fluid sprays derived from the present invention. Still moreover, the present invention is designed to be used with very high operating spray pressures. Conventional air supplies used for MQL systems generate air pressure in the range of between 10 and 150 psi. An optional gas booster pump (129), for example a Haskel AAD-5, Haskel Pump, Burbank, Calif. may be used to amplify conventional air supplies to between 500 and 1000 psi for use with the present invention. Higher air pressures generate higher vortex cooled air fractions, higher ozone production and ozonide yields/time, and higher fluid spray pressures for better cooling and lubrication action in the cutting zone.

Figure 12:
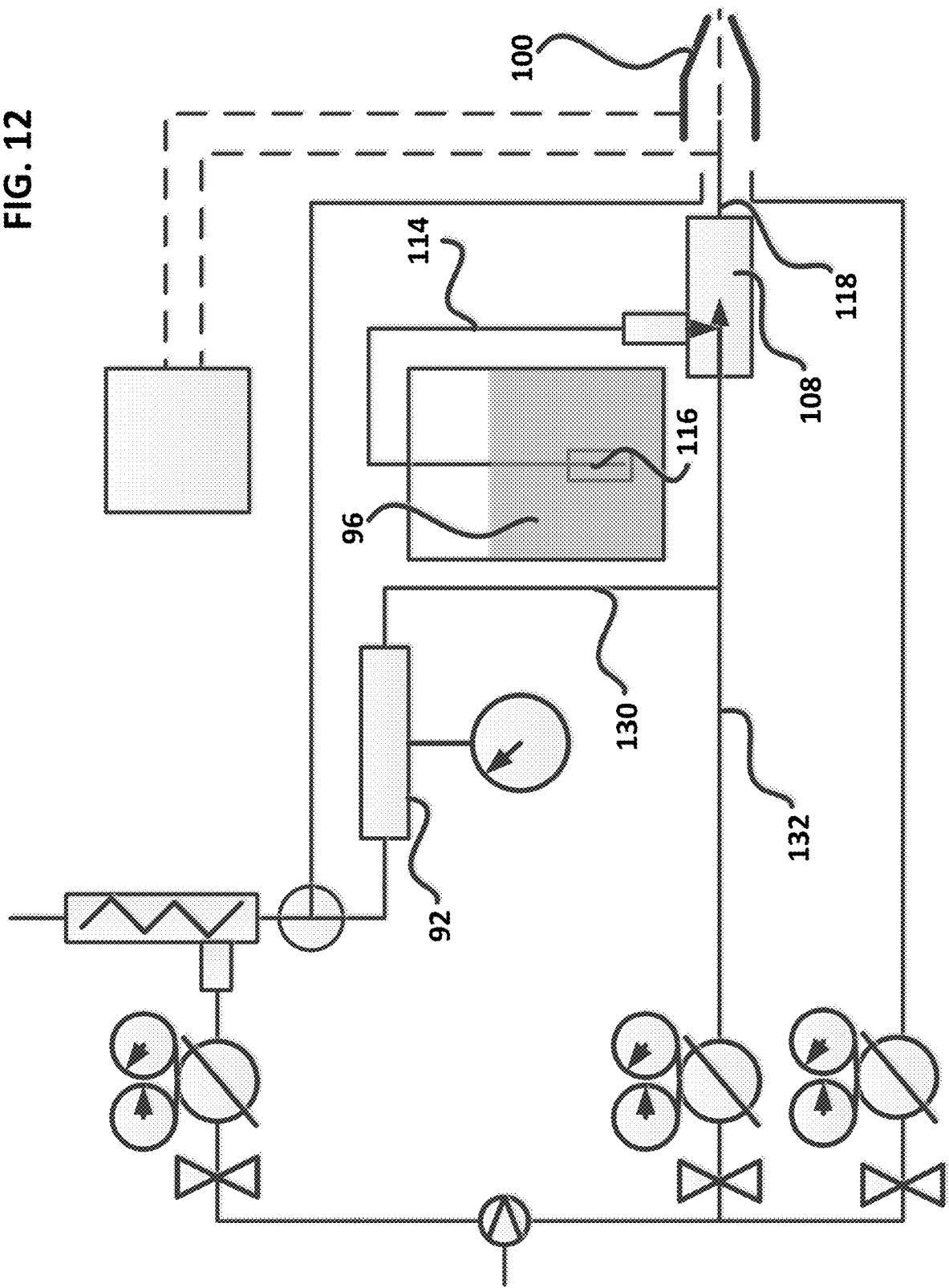
Figure 13:
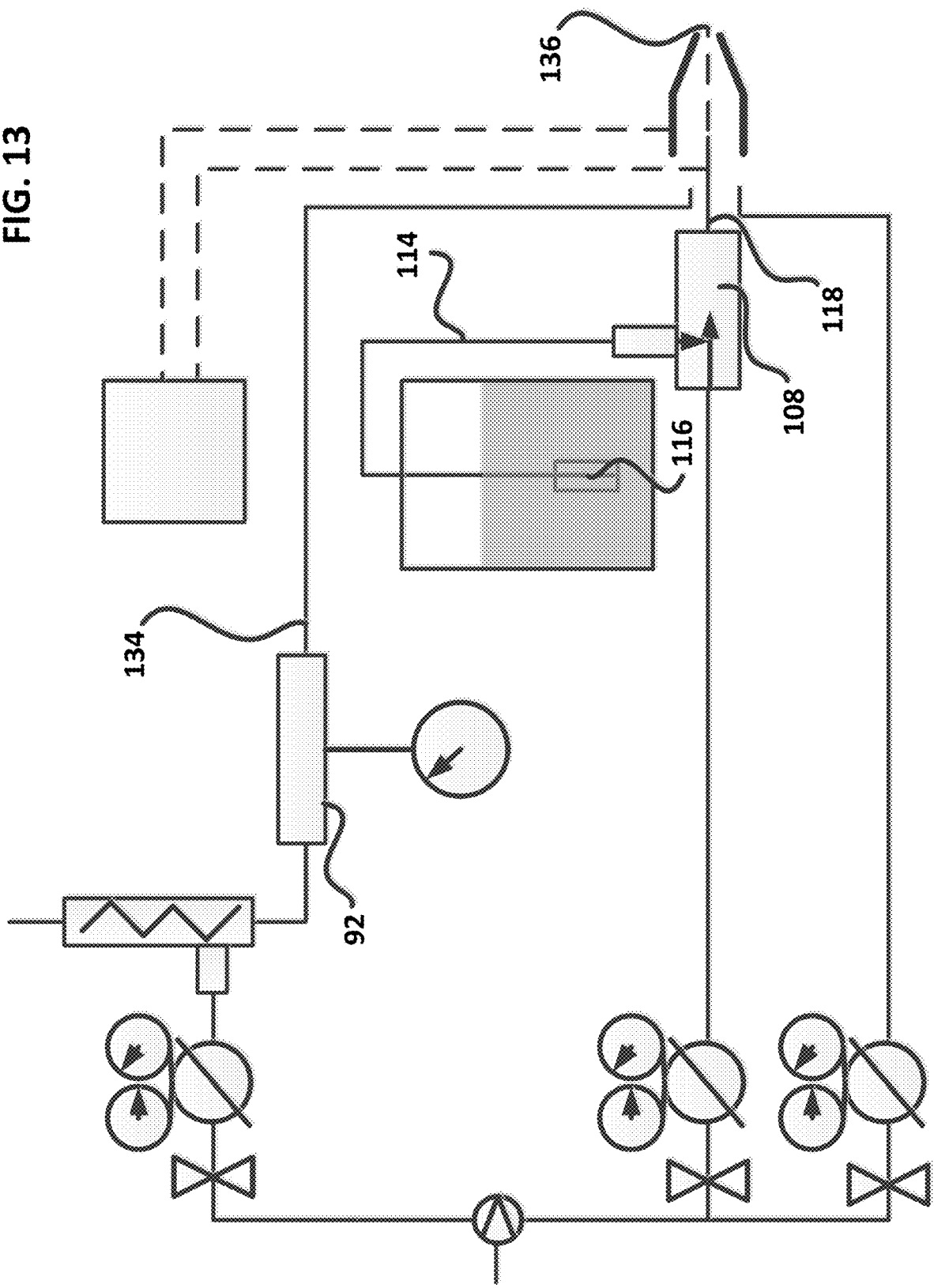

Having thus described the design and operation of an exemplary apparatus for generating and applying oxygenated bio-fluids under FIG. 11, several alternative oxygenating configurations derived from the apparatus of FIG. 11 are discussed under FIGS. 12 and 13. Only aspects relevant to these specific alterations will be discussed with the remaining aspects of these designs considered to be equivalent to those described under FIG. 11.

Figure 11A:
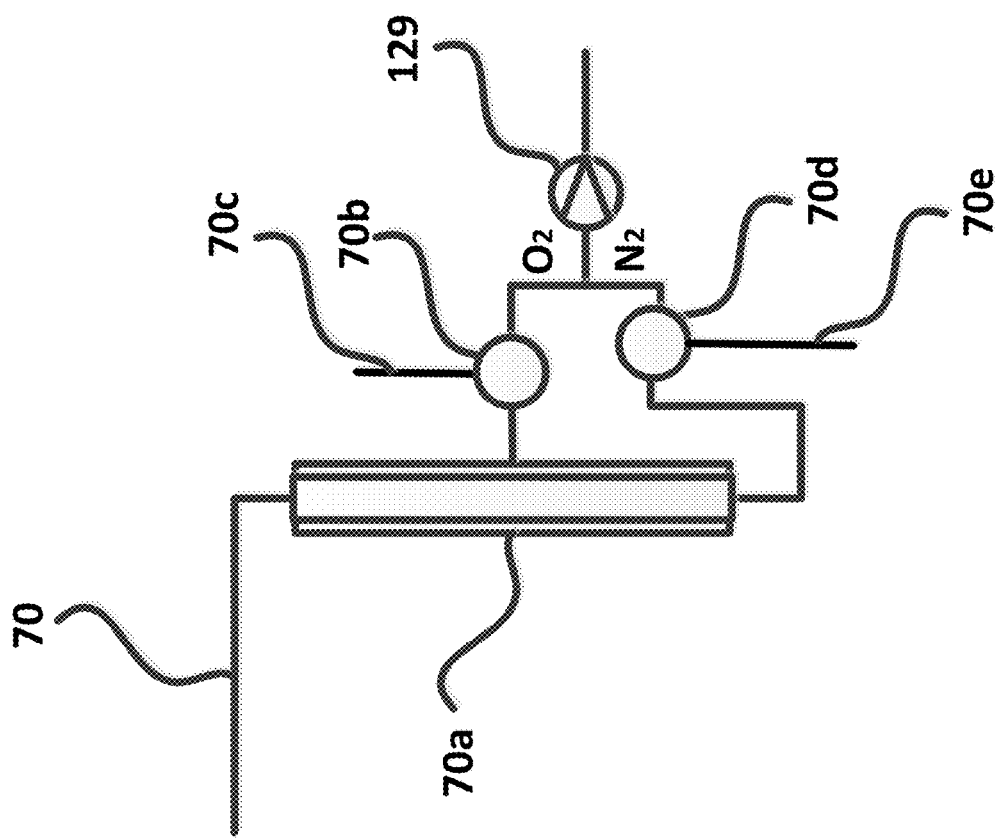

In certain machining applications, the absence of oxygen in the vicinity of the cut zone is more beneficial. As such, it is an aspect of the present invention to provide controlled levels of oxygen; from near-zero levels to levels well above ambient conditions present in conventional environments and fluids. Referring to FIG. 11*a*, an optional semi-permeable gas membrane (70*a*) is used to selectively produce an oxygen-rich or nitrogen-rich gas for use in the present invention. A first 3-way valve (70*b*) is affixed to the oxygen permeate side and a second 3-way valve (70*d*) is affixed to the nitrogen permeate side of the exemplary membrane (70*a*). The valves are operated as a flip-flop circuit (first valve on/second valve off; first valve off/second valve on) to produce either an oxygen-rich stream or a nitrogen-rich stream. When first 3-way valve (70*b*) is off, oxygen-rich air is bled to the ambient atmosphere through a vent pipe (70*c*). When second 3-way valve is off, nitrogen-rich air is fed through a vent pipe (70*e*). When either valve is on, the particular constituent-rich fluid is fed into an optional booster pump (129), and into the exemplary system of the present invention (not shown).

Now referring to FIG. 12, the ozonator (92) may be connected via ozonator outlet pipe (130) to the oxygenated fluid line (132). Using this configuration, the bio-oil suctioned into the eductor (108) via suction line (114) and filter (116) assembly is mixed with ozonated air to form the reactive mixture, and resulting oxygenated by-products, in transit to and through the exemplary capillary (118) coaxial with the spray applicator (100).

Now referring to FIG. 13, the ozonator (92) may be connected via ozonator outlet pipe (134) to the exemplary coaxial spray applicator (134) directly. Using this alternative configuration, the bio-oil suctioned into the eductor (108) via suction line (114) and filter (116) assembly, mixed with oxygenated air, and transported coaxially via capillary tube (118) is mixed with the cold ozonated air from pipe (134) within the air space located from the spray applicator nozzle (136) of exemplary spray applicator (100) to form the reactive mixture, and resulting oxygenated by-products, in transit from the nozzle exit and into the cutting zone.

FIG. 14 is a schematic showing an exemplary MQL applicator for transporting, forming and projecting an electrostatically-charged super-oxygenated machining fluid spray. The apparatus of FIG. 14 also constitutes an alternative means for oxygenating bio-fluids and mixtures, vis-à-vis in-situ ozonolysis reactions of same. Referring to FIG. 14, a wire electrode (138) connected to a grounded power supply (126) capable generating a voltage somewhere in the range between 5 kV and 40 kV, at a frequency somewhere in the range between 5 kHz and 60 kHz, is positioned coaxially within a dielectric capillary tube (118) constructed of PEEK, Teflon, Nylon etc. The electrode (138) is introduced into said capillary tube (118) using a dielectric connector tee (140) and traverses the entire internal length of the capillary tube (118). The electrode-in-capillary assembly (142) itself is coaxially positioned within a section of flexible stainless steel over-braided Teflon hose propellant line (146), wherein the stainless braided section in connected to the same ground (148) as the power supply (126).

When in operation, the apparatus of FIG. 14 generates an intense radial electrostatic field (150) between the wire electrode surface and grounded propellant line (146), by virtue of dielectric barrier discharge phenomenon also called silent discharge. This electric field ionizes constituents flowing within the capillary, including ionization of oxygen to ozone, and reactions with bio-fluids therein, as well as ionization of propellant gas flowing within the propellant tube (146). The electrode is made to protrude (152) from the capillary tube (118) and nozzle exit (154), and centrally positioned to project an intense electrostatic field into the spray and towards the cutting zone, further ionizing the mixture of oxygenated fluids and propellant gas into charged aerosols (156). Electrostatically charged oxygenated aerosols migrate along electric field and propellant fluid lines toward a grounded cutting zone (158).

FIG. 15 depicts exemplary coaxial and coaxial-Coanda nozzles for use with the present invention to form and project super-oxygenated machining fluid sprays. FIG. 15(A) shows a coaxial spray applicator design with the capillary (118) containing oxygenated fluids carried centrally within a propellant tube (146), and with fluids mixing occurring within the interior of nozzle exit portion (160). An alternative spray applicator scheme involves a Coanda nozzle. FIG. 15(B) depicts a coaxial-Coanda spray applicator design, with the capillary (118) containing oxygenated fluids carried centrally within a propellant tube (146), and with fluids mixing occurring outside the interior of nozzle exit portion (162).

Finally, as described herein, super-oxygenated gels can be derived from the present invention and used as immobile cooling-lubricating gels for applications such as horizontal machining or tapping operations, for example.

In this regard, FIG. 16 gives a schematic showing an exemplary system for producing a super-oxygenated machining gel or concentrate. Referring to FIG. 16, the exemplary oxygenated gel manufacturing system comprises a source of pure oxygen gas (164), through which it is passed through an inlet valve (166) and oxygen gas regulator (168). Regulated oxygen gas flows from regulator (168) into an exemplary air-cooled or water-cooled coaxial corona ozonator (170), commercially available from Plasma Technics Inc., Racine, Wis. Ozonated oxygen at a pressure of between 5 and 100 psi, and 0.1 and 5 lbs Ozone/day, is bubbled into a suitable reactor (172) compatible with ozonated gels (i.e., Teflon) containing one or more bio-fluids and additives (174) as described herein. Said reactor is enclosed with a mixing motor and impeller (176), ventilation system (178), and a chilled water reactor refrigeration system (180). The exemplary system is also equipped with a viscosity sensor (182) and computer control system and software (184), which controls the ozone-enabled gelation process via a control circuit (186) with said air-cooled ozonator (170). The system thus described is operated continuously until the viscosity sensor (182) and software (184) determine end-point for a pre-determined thickness point within the stirred reactor. Excess oxygenation reactor heat is removed with the chilled water system.

Now referring to FIG. 17, various exemplary oxygenated compositions can be developed using the present invention for use in ozonolytic machining and metalworking operations including turning, drilling, reaming, grinding, dicing, stamping, drawing, forming among many other types of cutting applications where oxygen content control is critical. Referring to FIG. 17, three exemplary classes or types of oxygenated fluids can be created using the present invention, classified as follows:

Type I Oxygenated Bio-Based Fluids (190)
Type II Oxygenated Synthetic Fluids (192)
Type III Oxygenated Microemulsions (194)

Oxygenated bio-based fluids (190) include organic compounds containing one or more double or triple carbon-carbon bonds which can produce super-oxygenated bio-based compounds using the present invention. Exemplary compounds may be derived from solid and semi-solid, dry or wet biological-based substrates including algae, jatropha, canola seeds, soybeans, corn, DDGs, rice bran, wood materials, cellulosic materials, seaweed, among other exemplary biological-based substrates containing oils (natural oleochemicals). Also alcohols, esters and aldehydes derived from bio-based oils containing double or triple bonds may also be used. These include, for example, olive oil, oleyl alcohol, ricinoleyl alcohol, stearic acid, and other unsaturated fatty alcohols and fatty acid esters. These may be used as base stocks, in pure mixtures or in combinations of same. In addition, optional additives may be used to enhance oxygenated machining fluid properties such as extreme pressure capability, anti-corrosiveness, viscosity, cooling capacity, and hydroxyl content; and which generally do not interfere with ozonation reactions of the present invention. In situations where a particular additive would hinder oxygenation reactions of the present invention, it may be added after ozonation reactions. Exemplary optional additives for oxygenated bio-based fluids are described in Table 1.

TABLE 1

Exemplary (Optional) Additives for Oxygenated Bio-Based Fluids

| Property | Exemplary Additives |
|---|---|
| Extreme Pressure and Anti-Wear | Molybdenum Disulfide ($MoS_2$), Dimethyl Sulfoxide (DMSO), Dimethyl Sulfone (DMSO2), and Polyfluoroalkyl polyether (PFPE) |
| Corrosion Prevention | Zinc Dithiophosphate |
| Viscosity Modifiers and Diluents | 1-Decene, 1-octadecene |
| Cooling Capacity | Dissolved gases: $CO_2$, $N_2$, Air |
| Hydroxyl Content | 1,2 tetradecanediol |

An exemplary bio-based fluid composition for use with the present invention is described in Table 2.

TABLE 2

Exemplary Oxygenated Bio-Based Fluid Composition

| Component | Percent by Volume |
|---|---|
| Oleic Acid | 50% |
| 1-decene | 47% |
| 1,2 tetradecanediol | 3% |

During ozonation reactions using apparatus and processes described in of the present invention, the exemplary composition of Table 2 produces an oxygen-rich mixture of oleyl acid, 1-decene, 1,2 tetradecanediol, oleyl ozonide, decanealdehyde, dissolved ozone and oxygen gases. Residual ozone gas and oxygen gas (free unbound oxygen content) may be discharged from the mixture though the introduction (sparging and pressurization) of pure carbon dioxide or nitrogen gas. This also terminates residual ozonation reactions. For example a mixing and reaction test was performed. The ingredients listed in Table 2 are mixed and are fully miscible with mechanical agitation. An oxygen saturated machining fluid is obtained by ozonolysis using the apparatus and method of the present invention for 16 hours at 250 mg/hour ozone dose rate. There is a strong odor of ozone that is greatly diminished to almost imperceptible by sparging the solution with air for several minutes. The mixture is thicker than the non-ozonated oil which is indicative of ozonide formation and cross-linking.

Oxygenated synthetic and semi-synthetic fluids (192) include organic compounds containing one or more double or triple carbon-carbon bonds which can produce super-oxygenated synthetic compounds using the present invention. Exemplary compounds may be derived from alkenes and olefins. These include, for example, 1-decene or 1-octadecene, and other unsaturated alkenes and olefins. These may be used as base stocks, in pure mixtures or in combinations of same. In addition, optional additives may be used to enhance oxygenated machining fluid properties such as extreme pressure capability, anti-corrosiveness, viscosity, cooling capacity, and hydroxyl content; and which generally do not interfere with ozonation reactions of the present invention. In situations where a particular additive would hinder oxygenation reactions of the present invention, it may be added after ozonation reactions. Exemplary optional additives for oxygenated synthetic fluids are described in Table 3.

TABLE 3

Exemplary (Optional) Additives for Oxygenated Synthetic Fluids

| Property | Exemplary Additives |
| --- | --- |
| Extreme Pressure and Anti-Wear | Molybdenum Disulfide ($MoS_2$), Dimethyl Sulfoxide (DMSO), Dimethyl Sulfone (DMSO2), and Polyfluoroalkyl polyether (PFPE) |
| Corrosion Prevention | Zinc Dithiophosphate |
| Viscosity Modifiers and Diluents | Volatile methyl siloxanes |
| Cooling Capacity | Dissolved gases: $CO_2$, $N_2$, Air |
| Hydroxyl Content | 1,2 tetradecanediol |

An exemplary synthetic fluid composition for use with the present invention is described in Table 4.

TABLE 4

Exemplary Oxygenated Synthetic Fluid Composition

| Component | Percent by Volume |
| --- | --- |
| Oleyl Alcohol | 50% |
| 1-octadecene | 47% |
| 1,2 tetradecanediol | 3% |

During ozonation reactions using apparatus and processes described in of the present invention, the exemplary composition of Table 4 produces an oxygen-rich mixture of oleyl alcohol, 1-decene, 1,2 tetradecanediol, oleyl ozonide, decanealdehyde, dissolved ozone and oxygen gases. Residual ozone gas and oxygen gas (free unbound oxygen content) may be discharged from the mixture though the introduction (sparging and pressurization) of pure carbon dioxide or nitrogen gas. This also terminates residual ozonation reactions. For example a mixing and reaction test was performed. The ingredients listed in Table 4 are mixed and are fully miscible with mechanical agitation. An oxygen saturated machining fluid is obtained by ozonating using the apparatus and method of the present invention for 16 hours at 250 mg/hour ozone dose rate. There is a strong odor of ozone that is greatly diminished to almost imperceptible by sparging the solution with air for several minutes. The mixture is thicker than the non-ozonated alcohol which is indicative of ozonide formation and cross-linking.

In certain machining applications, the presence of water to provide enhanced cooling and hydroxyl chemistry may be beneficial. In such cases, semi-aqueous oxygenated fluids or oxygenated microemulsions are desirable. Oxygenated microemulsions (194) include water (deionized water preferred) in combination with various amounts of organic compounds containing one or more double or triple carbon-carbon bonds which can produce super-oxygenated synthetic compounds using the present invention. Exemplary compounds may be derived from bio-based, alkenes and olefins. These include, for example, oleyl alcohol, 1-decene or 1-octadecene, and other unsaturated bio-based oils and alcohols and unsaturated synthetic alkenes and olefins. These may be used as ozonated working solutions or water-diluted concentrates containing ozonides. In addition, optional additives may be used to enhance oxygenated machining fluid properties such as extreme pressure capability, anti-corrosiveness, viscosity, surface tension, electrical conductivity (for use in processes requiring electrical conductivity of machining fluids such as electrolytic in-process dressing (ELID) used in dicing operations) and hydroxyl chemistry content; and which generally do not interfere with ozonation reactions of the present invention. In situations where a particular additive would hinder oxygenation reactions of the present invention, it may be added after ozonation reactions. Exemplary optional additives for oxygenated microemulsions are described in Table 5.

TABLE 5

Exemplary (Optional) Additives for Oxygenated Microemulsions

| Property | Exemplary Additives |
| --- | --- |
| Extreme Pressure and Anti-Wear | Molybdenum Disulfide ($MoS_2$), Dimethyl Sulfoxide (DMSO), Dimethyl Sulfone (DMSO2), and Polyfluoroalkyl polyether (PFPE) |
| Corrosion Prevention | Zinc Dithiophosphate |
| Surface Tension and Emulsifier | Oleyl Alcohol, Triton X-100 (non-ionic surfactant) |
| Cooling Capacity | Dissolved gases: $CO_2$, $N_2$, Air |
| Electrical Conductivity | Organic and Inorganic Salts |

An exemplary oxygenated microemulsion composition for use with the present invention is described in Table 6.

TABLE 6

Exemplary Oxygenated Microemulsion Composition

| Component | Percent by Volume (Ranges) |
|---|---|
| Water, Deionized (18 megaohms) | 50%-95% |
| Oleic Acid | 0.5%-45% |
| Triton X-100 | 0.1%-5% |

During ozonation reactions using apparatus and processes described in of the present invention, the exemplary composition of Table 6 produces an oxygen-rich mixture of water, oleic acid, ozonides, and dissolved ozone and oxygen gases. Residual ozone gas and oxygen gas (i.e., dissolved unbound oxygen content) may be discharged from the mixture though the introduction (sparging and pressurization) of pure carbon dioxide or nitrogen gas. This also terminates residual ozonation reactions. It is also noteworthy that the compounds produced vis-à-vis ozonolysis of oleic acid in the presence of water produces hydrolyzed by-products of oleic acid-derived ozonides such as carboxylic acids and aldehydes. In a first experimental test, the ingredients listed in Table 6 are mixed using olive oil, water and surfactant, which initially separate into two distinct phases. A milky-white and stable microemulsion is produced in less than 10 minutes of ozonation with the ozone sparging action providing adequate mechanical agitation. Another experiment was performed. Oxygenated oil was obtained by ozonolysis of a soybean oil mixture for 16 hour at 250 mg/hour ozone dose rate. Following this, a few drops of Triton X-100 was mixed into 20 grams of ozonated soybean oil, and 250 ml of water was added to the mixture and agitated for 30 minutes to form an opaque, stable microemulsion. It is noteworthy that a microemulsion produced with oxygen-saturated oil is much more viscous than the microemulsion produced by first combining ingredients of Table 6, followed by ozonolysis.

The present invention can be used in numerous machining and metalworking applications. The addition of expandable gases into solution, and particularly carbon dioxide, can be used to produce bubbly flow which enhances heat dissipation in the cut zone and separation of microscopic particles from solution. The selection of machining fluids for use in the present invention such as 1-decene that can dissolve large volumes of, and are highly soluble in, carbon dioxide increases both the heat capacity of the machining fluid (volume of $CO_2$ dissolved in machining fluid) and efficiency of post-cleaning operations and recovery of the machining oils (volume of machining fluid dissolved in $CO_2$) for reuse. Thus a novel closed-loop method and process for machining and cleaning a substrate combines the present invention with exemplary and patented $CO_2$ composite spray and liquid $CO_2$ immersion cleaning processes and apparatuses developed by the present inventor. This is the subject of a separate and co-pending provisional patent application by the present inventor.

Figure 18:
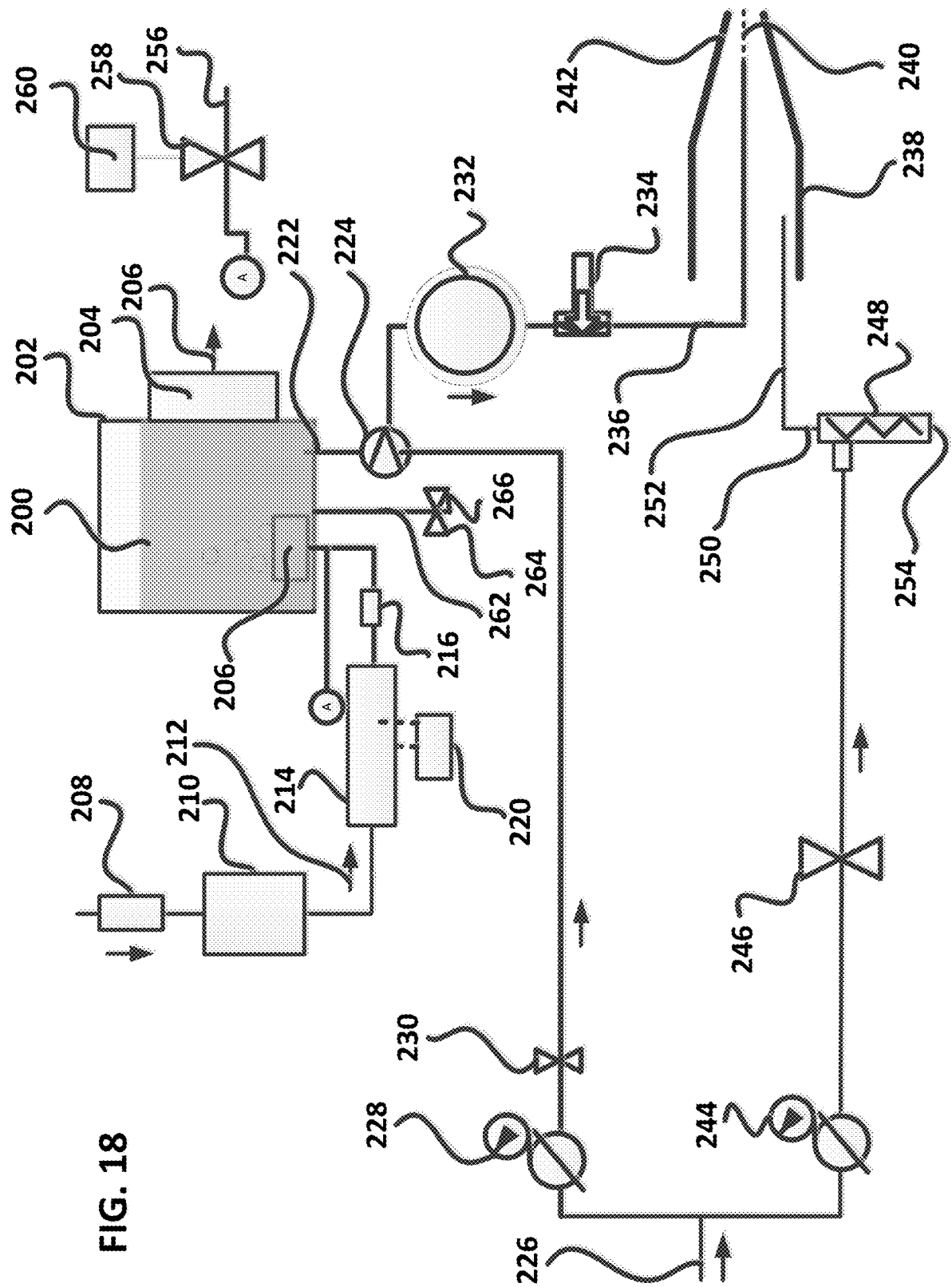

FIG. 18 gives an exemplary apparatus and method that employs a thermoelectric heat pump, high pressure liquid pump, and a long PEEK capillary reactor to accelerate the reaction of dissolved ozone gas with unsaturated lubricant to form an oxygenated lubricant, and to meter same into a coaxial MQL spray applicator, which then combines oxygenated lubricant droplets with a vortex-tube cooled propellant gas to form a cool oxygenated MQL spray. Referring to FIG. 18, an unsaturated liquid lubricant (200), located in a non-pressurized and vented container (202), is cooled to temperature below ambient temperature using a thermoelectric cooler (204) incorporating a fan (206) to remove excess heat contained in said lubricant to the atmosphere. The temperature is lowered within the range of between −20 degrees C. to 30 degrees C. to form a subcooled unsaturated liquid lubricant therein. Following temperature lowering, an ozonated airstream is sparged through the subcooled lubricant for a time to dissolve ozone gas into solution as well as begin the process of oxygenating said subcooled liquid lubricant. This is accomplished as follows. Air is drawn into and through a filter-dryer (208), for example a filter-dryer such as available from Parker Filters, Model DD10-02, using an air pump (210) to produce a stream (212) of clean-dry air containing 20% oxygen gas. Clean-dry air (212) is pumped into and through an ozonator (214) to produce an ozonated air having a concentration of between 0.2 mg/hour and 15000 mg/hour, check valve (216), and through a gas sparger (218) located within said container (202) and submerged at the lower level of subcooled liquid lubricant (200) contained therein. A simple electronic controlled timer (220) may be used to preform said ozonation process for a pre-determined time to produce a desired level of initial oxygenation, which besides time, is dependent upon the degree of unsaturation within the lubricant chemistry, volume of same, and concentration of ozone gas sparged through the solution. The stoichiometry of ozone reaction with unsaturated bonds is roughly 1 mole of ozone per mole of unsaturated carbon-carbon bonds. Subcooled and ozone gas-saturated liquid lubricant is drawn through a bottom port and pipe (222) and into an air-driven high pressure liquid pump (224), for example a Model M21 HP Pump, available from Haskel International, Burbank, Calif. The high pressure pump (224) fluid compression pressure is proportional to its air drive pressure. Air drive pressure is derived from a supply of compressed air (226), which is regulated between 40 psi and 150 psi using a high-flow pressure regulator (228), and flowed through a flow control valve (230) to the high pressure pump (224). Subcooled and ozone gas-saturated liquid lubricant is pressurized into and through a PEEK capillary reactor tube assembly (232) at a pressure of between 1 atm and 150 atm. Higher reaction pressures produce faster ozone reactions with unsaturated bonds, depleting residual ozone gas contained within solution. The PEEK capillary tube reactor assembly (232) comprises PEEK tubing having an internal diameter ranging from 0.020 inches to 0.080 inches and a length of between 1 feet and 20 feet. A micrometering valve (234) is used to control back-pressure and flow of the ozone-reacted lubricant within the capillary reactor assembly (232) and flow through a PEEK capillary delivery tube (236). The PEEK capillary delivery tube (236) has an internal diameter ranging from 0.020 inches to 0.080 inches and a length of between 1 feet and 20 feet. Said PEEK capillary delivery tube (236) traverses coaxially and internally within a second propellant gas tube (238), containing a cooled and flowing propellant gas, and is mixed within (240) and projected from a coaxial or Coanda mixing nozzle (242). The subcooled and ozone-saturated lubricant flows at a flowrate of between 20 mls/hour and 250 mls/hour. Cool propellant gas is derived from a supply of compressed air (226), which is regulated between 40 psi and 150 psi using a high-flow pressure regulator (244), and flowed through a flow control valve (246) and into and through the inlet of a Vortex gas cooling tube (248), such as available from AirTx (http://www.airtx.com), to produce a cold propellant gas stream and waste hot gas stream. The cold propellant gas stream (250) to flowed through a pipe (252) and into and through the coaxial delivery assembly comprising the propellant gas tube (238) containing PEEK capillary delivery tube, and mixing nozzle (242). Waste hot gas (254) is discharged from the system.

Finally, and again referring to FIG. 18, a inert purge gas may be used to eliminate residual ozone gas from subcooled lubricant (200) to cease ozonation reactions in preparation for use or prior to draining residual reacted lubricant. A source of inert purge gas (256) such as air, nitrogen or carbon dioxide is optionally ported through a control valve (258), controlled by a timer (260), and connected to gas sparger (218), depicted as connecting segment (A). Following ozone purging operations, residual lubricant (200) may be drained from the container (202) through a drain pipe (262) and drain valve (264), and collected from a drain port (266).

It should be noted that the present invention is not limited to the example compositions, spray applicators, and applications described herein. For example, the present invention may be used to form oxygenated fluids for flooded application, and applied in through-tool and through-spindle machine tool configurations, and is beneficial for dicing, drilling, tapping, threading, milling, broaching, turning, swaging, stamping, rolling, splitting, among many other machining and metalworking applications, as well as general machine lubrication applications.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6. Any headings or labels within the text of the specification are for the convenience of the reader and are not intended to be limiting.

I claim:

1. A method for machining a workpiece employing an oxygenated lubricant aerosol with a metalworking tool, the steps comprising:
   a. reacting ozonated gas with an unsaturated liquid lubricant containing a dye to form an oxygenated lubricant, which contains reactive ozonide and ozone-reacted dye;
   b. monitoring and controlling oxygenation level in said oxygenated lubricant by color change;
   c. injecting said oxygenated lubricant into a compressed gas stream to form the oxygenated lubricant aerosol;
   d. applying said oxygenated lubricant aerosol on the workpiece; and
   e. simultaneously performing a machining process on the workpiece with the metalworking tool;
      whereby the oxygenated lubricant aerosol containing the reactive ozonide lowers friction during the machining of the workpiece.

2. The method of claim 1 wherein the reacting ozonated gas is further defined by:
   contacting a predetermined amount of the unsaturated liquid lubricant, which contains the dye, with a predetermined amount of the ozonated gas,
      having a concentration between 0.2 mg/hour and 15000 mg/hour of ozone,
      at a temperature of between −20 degrees C. and 30 degrees C. and at a pressure of between 1 atm and 150 atm.

3. The method of claim 1 wherein said unsaturated liquid lubricant is at least one of synthetic oil, natural oil, bio-based oil, soybean oil, castor oil, olive oil, rapeseed oil, jatropha oil, corn oil, safflower oil, long-chain alcohol, oleyl alcohol or ricinoleyl alcohol.

4. The method of claim 1 wherein said unsaturated liquid lubricant is modified with sulfur-containing organic and inorganic compounds, fluorine-containing organic compounds, corrosion prevention agents, viscosity modifiers, dimethyl sulfoxide (DMSO), or dimethyl sulfone (DMSO2).

5. The method of claim 1 wherein the reacting of said unsaturated liquid lubricant with the ozonated gas in the presence of deionized water and surfactant to form the oxygenated lubricant as a microemulsion.

6. The method of claim 1 further comprising sparging said oxygenated lubricant with compressed air, nitrogen or carbon dioxide for a predetermined period of time, after reacting the ozonated gas with the unsaturated liquid lubricant, to remove residual, unreacted ozone gas.

7. The method of claim 1 wherein the compressed gas stream comprises a cold compressed gas stream.

8. The method of claim 1 wherein said oxygenated lubricant aerosol is applied in the workpiece as a spray-at-tool, spray-through-spindle, or spray-through-tool configuration for stationary and portable machining and metalworking systems and tools.

9. The method of claim 1 wherein said machining process comprises turning, grinding, dicing, drilling, milling, broaching, reaming, and stamping; the metalworking tool comprises at least one of coated and uncoated carbide, steel, and ceramic drills, inserts, saws, grinding and cutting wheels; and tool coatings comprise TiN, TiAlN, or TiAlN—WC—C; and the workpiece comprises metals, ceramics, plastics, glasses, or composites.

10. The method of claim 1 wherein a source of oxygen gas for reacting the ozonated gas with the unsaturated liquid lubricant, which contains the dye, is derived from a semi-permeable gas membrane.

11. A method for machining a workpiece employing an oxygenated lubricant aerosol with a metalworking tool, the steps comprising:
   a. reacting ozonated gas with an unsaturated liquid lubricant to form an oxygenated lubricant containing reactive ozonide;
   b. wherein oxygenation level in said oxygenated lubricant is monitored and controlled by a viscosity sensor or a digital timer;
   c. injecting said oxygenated lubricant into a compressed gas stream to form the oxygenated lubricant aerosol;

d. applying said oxygenated lubricant aerosol on the workpiece; and e. simultaneously performing a machining process on the workpiece with the metalworking tool;

whereby the oxygenated lubricant aerosol containing the reactive ozonide lowers friction during the machining of the workpiece.

12. The method of claim 11, wherein the oxygenated lubricant has a measurable ozonide level between 0.1 percent and 10 percent.

13. The method of claim 11 wherein said unsaturated liquid lubricant is at least one of synthetic oil, natural oil, bio-based oil, soybean oil, castor oil, olive oil, rapeseed oil, jatropha oil, corn oil, safflower oil, long-chain alcohol, oleyl alcohol or ricinoleyl alcohol;

the unsaturated lubricant is modified with sulfur-containing organic and inorganic compounds, fluorine-containing organic compounds, corrosion prevention agents, viscosity modifiers, dimethyl sulfoxide (DMSO), or dimethyl sulfone (DMSO2).

14. The method of claim 11 wherein the reacting of said unsaturated liquid lubricant with the ozonated gas in the presence of deionized water and surfactant to form the oxygenated lubricant as a microemulsion.

15. The method of claim 11 wherein the compressed gas stream comprises a cold compressed gas stream.

16. A method for machining a workpiece employing an oxygenated lubricant aerosol with a metalworking tool, the steps comprising:

a. sparging an unsaturated liquid lubricant with an ozonated gas to form an oxygenated lubricant containing reactive ozonide; said oxygenated lubricant having a measurable ozonide level between 0.1 percent and 10 percent;

b. wherein oxygenation level in said oxygenated lubricant is monitored and controlled by a digital timer or a viscosity sensor;

c. injecting said oxygenated lubricant into a compressed gas stream to form the oxygenated lubricant aerosol;

d. applying said oxygenated lubricant aerosol on the workpiece; and e. simultaneously performing a machining process on the workpiece with the metalworking tool;

whereby the oxygenated lubricant aerosol containing the reactive ozonide lowers friction during the machining of the workpiece.

17. The method of claim 16 wherein said unsaturated liquid lubricant is at least one of synthetic oil, natural oil, bio-based oil, soybean oil, castor oil, olive oil, rapeseed oil, jatropha oil, corn oil, safflower oil, long-chain alcohol, oleyl alcohol or ricinoleyl alcohol;

the unsaturated lubricant is modified with sulfur-containing organic and inorganic compounds, fluorine-containing organic compounds, corrosion prevention agents, viscosity modifiers, dimethyl sulfoxide (DMSO), or dimethyl sulfone (DMSO2).

* * * * *